(12) United States Patent
Gutierrez et al.

(10) Patent No.: US 11,907,448 B2
(45) Date of Patent: Feb. 20, 2024

(54) SYSTEMS, DEVICES, AND METHODS FOR PHYSICAL SURFACE TRACKING WITH A STYLUS DEVICE IN AN AR/VR ENVIRONMENT

(71) Applicant: Logitech Europe S.A., Lausanne (CH)

(72) Inventors: Mario Gutierrez, Renens (CH); Philip Waldron, Cork (IE); Fabien Zellweger, Cork (IE); Damien O'Sullivan, Cork (IE)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/135,059

(22) Filed: Apr. 14, 2023

(65) Prior Publication Data
US 2023/0297176 A1    Sep. 21, 2023

Related U.S. Application Data

(60) Division of application No. 17/371,656, filed on Jul. 9, 2021, now Pat. No. 11,644,907, which is a continuation-in-part of application No. 17/186,838, filed on Feb. 26, 2021, now Pat. No. 11,397,478.

(51) Int. Cl.
| | | |
|---|---|---|
| *G06F 3/0354* | (2013.01) | |
| *G06F 3/01* | (2006.01) | |
| *G06F 3/0346* | (2013.01) | |
| *G06F 3/03* | (2006.01) | |
| *G06F 3/038* | (2013.01) | |

(52) U.S. Cl.
CPC .......... *G06F 3/03545* (2013.01); *G06F 3/016* (2013.01); *G06F 3/0304* (2013.01); *G06F 3/038* (2013.01); *G06F 3/0346* (2013.01)

(58) Field of Classification Search
CPC .... G06F 3/03545; G06F 3/016; G06F 3/0304; G06F 3/0346; G06F 3/038
See application file for complete search history.

(56) References Cited

U.S. PATENT DOCUMENTS

| | | | |
|---|---|---|---|
| 11,550,397 B1 * | 1/2023 | Pezent | G06F 3/011 |
| 11,789,541 B2 * | 10/2023 | Ron | G06F 3/03545 345/174 |
| 2005/0248549 A1 * | 11/2005 | Dietz | G06F 3/03545 345/179 |
| 2010/0160041 A1 * | 6/2010 | Grant | G06F 3/0485 463/31 |

(Continued)

*Primary Examiner* — Ariel A Balaoing
(74) *Attorney, Agent, or Firm* — Kilpatrick Townsend & Stockton LLP

(57) ABSTRACT

A method includes receiving sensor data from one or more sensors that corresponds to a location of a stylus device and determining that a tip of the stylus device is in contact with a physical surface based on the sensor data. While in contact, the method includes determining a new location of the tip of the stylus device based on the location data, mitigating a tracking error of the determined new location of the tip of the stylus device by translating the new location from a 3D space domain to a 2D space domain that corresponds to the physical surface and adjusting the new location based on a comparison of the new location and historical locations. The stylus device can further ascertain surface characteristics through sensor data and simulate surface characteristics via haptic feedback effects.

7 Claims, 16 Drawing Sheets

(56) References Cited

U.S. PATENT DOCUMENTS

| | | | |
|---|---|---|---|
| 2010/0214239 A1* | 8/2010 | Wu | G06F 3/016 |
| | | | 345/173 |
| 2013/0113715 A1* | 5/2013 | Grant | G06F 3/04886 |
| | | | 345/173 |
| 2014/0085200 A1* | 3/2014 | Ito | G06F 3/016 |
| | | | 345/157 |
| 2014/0292690 A1* | 10/2014 | Sugihara | G06T 11/203 |
| | | | 345/173 |
| 2015/0227210 A1* | 8/2015 | Chen | G06F 3/017 |
| | | | 345/156 |
| 2016/0054798 A1* | 2/2016 | Messingher | G06F 3/014 |
| | | | 345/156 |
| 2021/0011562 A1* | 1/2021 | Connellan | G06F 3/03545 |
| 2022/0276729 A1* | 9/2022 | Gutierrez | G06F 3/03545 |
| 2023/0013425 A1* | 1/2023 | Iriyama | G10H 3/146 |

* cited by examiner

The quick brown

The quick brown fox jumps over

The quick brown fox jumps over a lazy dog

SYSTEMS, DEVICES, AND METHODS FOR PHYSICAL SURFACE TRACKING WITH A STYLUS DEVICE IN AN AR/VR ENVIRONMENT

CROSS-REFERENCES TO RELATED APPLICATIONS

This application is a divisional of U.S. Non-Provisional patent application Ser. No. 17/371,656, filed, Jul. 9, 2021, and titled "SYSTEMS, DEVICES, AND METHODS FOR PHYSICAL SURFACE TRACKING WITH A STYLUS DEVICE IN AN AR/VR ENVIRONMENT" which is a continuation-in-part (CIP) of U.S. Non-Provisional patent application Ser. No. 17/186,838, filed, Feb. 26, 2021, and titled "SYSTEMS, DEVICES, AND METHODS FOR PHYSICAL SURFACE TRACKING WITH A STYLUS DEVICE IN AN AR/VR ENVIRONMENT," which is incorporated by reference in its entirety into the present application for all purposes.

BACKGROUND

Virtual, mixed, or augmented reality can be associated with a variety of applications that comprise immersive, highly visual, computer-simulated environments. These environments, commonly referred to as augmented-reality (AR), virtual-reality (VR), and mixed-reality (MR) environments, can simulate a physical presence of a user in a real or imagined world. The computer simulation of these environments can include computer rendered images, which can be presented by means of a graphical display. The display can be arranged as a head mounted display (HMD) that may encompass all or part of a user's field of view.

A user can interface with the computer-simulated environment by means of a user interface device or peripheral device. A common controller type in many contemporary AR/VR systems is the pistol grip controller, which can typically operate with three or six degrees-of-freedom (DOF) of tracked movement, depending on the particular system. When immersed in a computer-simulated AR/VR environment, the user may perform complex operations associated with the interface device, including simulated movement within the AR/VR virtual environment, virtual object interaction and manipulation, and more. Despite their usefulness, pistol grip controllers in contemporary AR/VR systems tend to be bulky, unwieldy, cumbersome, and can induce fatigue in a user due to its weight and large tracking features that often include an obtrusive and protruding donut-shaped structure. The pistol grip shape can help minimize fatigue as a user can typically hold objects in a pistol grip configuration for longer periods of time, but at the cost of only allowing coarse and inarticulate movement and ungainly control.

Stylus devices can allow a user to articulate precise movements with a high degree of control, due in part to the stylus's similarity with typical handheld writing utensils, such as pens and pencils. Stylus use in an AR/VR environment can present many advantages over real world writing implements including 3D writing, object scaling, etc., which can give a user many drafting and editing options not available in the real world. Despite their usefulness, many stylus-based systems are fraught with significant tracking deficiencies. While a user may be able to finely articulate the stylus device as they would a pen, tracking those articulations with a high degree of accuracy is problematic, particularly with writing and other applications that require fine motor control. Better tracking solutions are needed.

BRIEF SUMMARY

In certain embodiments, a stylus tracking system comprises one or more processors, and a set of one or more sensors controlled by the one or more processors and configured to generate sensor data, the sensor data including location data usable to derive a location of a stylus device. The one or more processors can be configured to determine a location of a tip of the stylus device based on the location data, generate a virtual rendered output that is expelled from the tip of the stylus device, wherein the virtual rendered output includes a virtual mass, and dynamically modulate a haptic feedback on the stylus device based on a total amount of virtual mass of the virtual rendered output that was expelled at a current location of the tip of the stylus device. In some aspects, the virtual rendered output can be virtual ink or paint. The total amount of virtual mass of the virtual rendered output at the current location of the tip of the stylus device may correspond to an amount of virtual ink or paint that was expelled from the tip of the stylus device at the current location. A shape of the virtual rendered output may correspond to a selected virtual type of writing implement. In some aspects, an intensity of the haptic feedback is proportional to the total amount of virtual mass of the virtual rendered output at the current location of the tip of the stylus device. The one or more processors can be further configured to determine that the tip of the stylus device is operating against a physical surface based on the sensor data, wherein the virtual rendered output is generated in response to determining that the tip of the stylus device is operating against the physical surface. The set of one or more sensors may include at least from the group of: optical sensors and inertial sensors.

In certain embodiments, a method of tracking a stylus device in an AR/VR environment can include receiving, by one or more processors from a set of one or more sensors, sensor data that includes location data usable to derive a location of a stylus device; determining a location of a tip of the stylus device based on location data; generating a virtual rendered output that is expelled from the tip of the stylus device, wherein the virtual rendered output includes a virtual mass; and dynamically modulating a haptic feedback on the stylus device based on a total amount of virtual mass of the virtual rendered output that was expelled at a current location of the tip of the stylus device. In some aspects, the virtual rendered output is virtual ink or paint. The total amount of virtual mass of the virtual rendered output at the current location of the tip of the stylus device may correspond to an amount of virtual ink or paint that was expelled from the tip of the stylus device at the current location. A shape of the virtual rendered output may correspond to a selected virtual type of writing implement. An intensity of the haptic feedback is proportional to the total amount of virtual mass of the virtual rendered output at the current location of the tip of the stylus device. In some embodiments, the method can further include determining that the tip of the stylus device is operating against a physical surface based on the sensor data, wherein the virtual rendered output is generated in response to determining that the tip of the stylus device is operating against the physical surface.

In further embodiments, a stylus tracking system for use in an AR/VR environment includes one or more processors and a set of one or more sensors controlled by the one or more processors and configured to generate sensor data, the sensor data including location data usable to derive a location of a stylus device. The one or more processors are configured to: determine a location of a tip of the stylus device based on the location data; determine a location of a virtual surface in the AR/VR environment; determine virtual surface characteristics of the virtual surface; generate a haptic output on the stylus device when the tip of the stylus device makes contact with the virtual surface in the AR/VR environment, the haptic output based on the virtual surface characteristics of the virtual surface; determine when a scaling of the virtual surface has changed; and modify the haptic output on the stylus device based on the scaling of the virtual surface. In some aspects, the scaling includes increasing or decreasing a magnification of the virtual surface in the AR/VR environment. The set of one or more sensors includes at least one optical sensor or microphone, wherein the virtual surface characteristics of the virtual surface are based on sensor data of the optical sensor or microphone. The virtual surface characteristics for the virtual surface are based on a selection of known surface types.

In certain embodiments, a method of tracking a stylus device in an AR/VR environment includes receiving, by one or more processors from a set of one or more sensors, sensor data that includes location data usable to derive a location of a stylus device; determining a location of a tip of the stylus device based on the location data; determining a location of a virtual surface in the AR/VR environment; determining virtual surface characteristics of the virtual surface; generating a haptic output on the stylus device when the tip of the stylus device makes contact with the virtual surface in the AR/VR environment, the haptic output based on the virtual surface characteristics of the virtual surface; determining when a scaling of the virtual surface has changed; and modifying the haptic output on the stylus device based on the scaling of the virtual surface. The scaling can include increasing or decreasing a magnification of the virtual surface in the AR/VR environment. The set of one or more sensors can include at least one optical sensor or microphone, wherein the virtual surface characteristics of the virtual surface are based on sensor data of the optical sensor or microphone.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects, features and advantages of embodiments of the present disclosure will become apparent from the following description of embodiments in reference to the appended drawings.

DETAILED DESCRIPTION

Figure 1A:
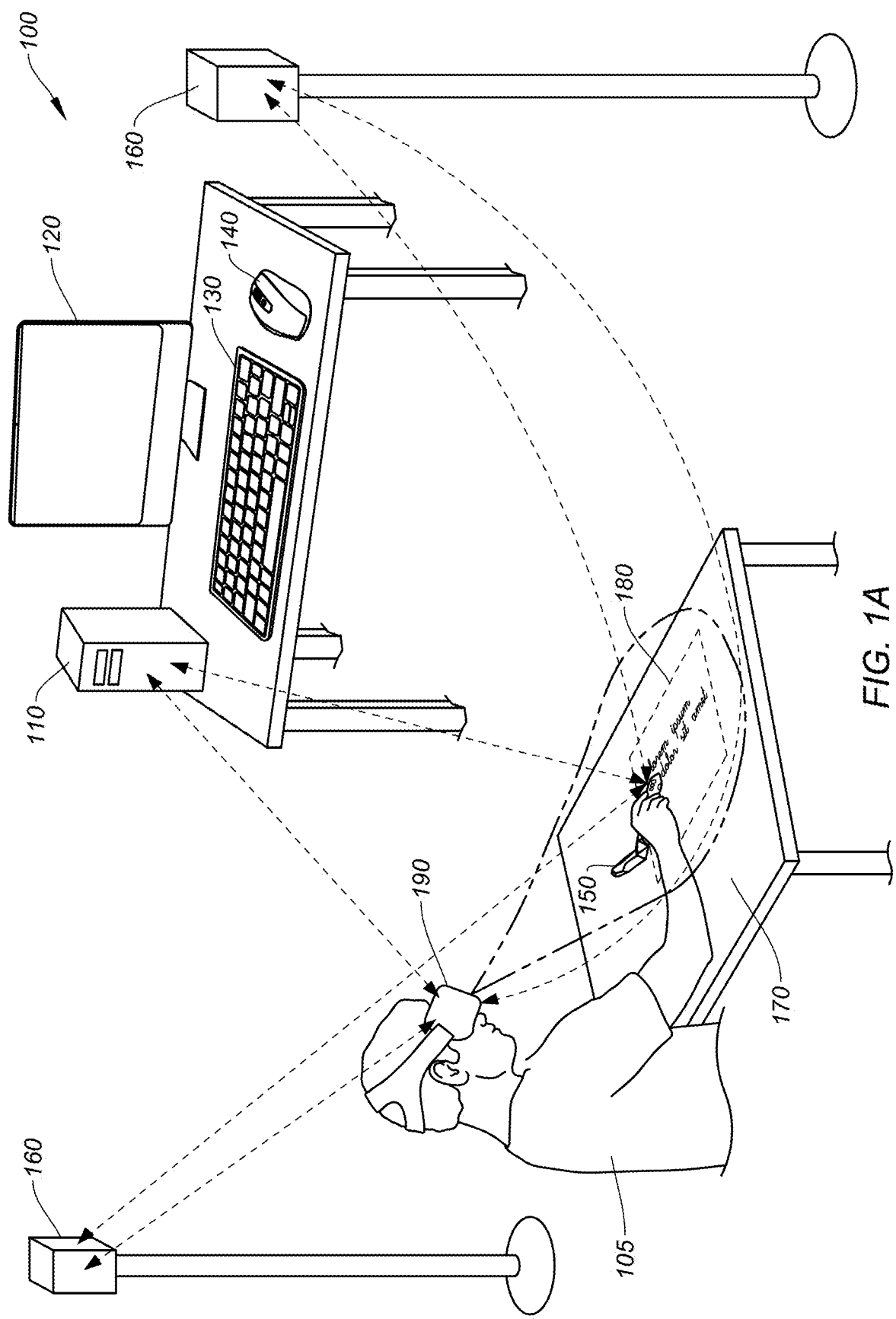
FIG. 1A shows a user operating a stylus device on a physical surface in an AR/VR environment, according to certain embodiments.

Embodiments of this invention are generally directed to control devices configured to operate in AR/VR-based systems. More specifically, some embodiments relate to a stylus device system configured to mitigate a tracking error of the stylus device while operating on a physical surface.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

To provide a high level, broad understanding of some aspects of the present disclosure, a non-limiting summary of certain embodiments are presented here. Stylus devices, as described herein, can be used as an input tool that can be used with a touchscreen-enabled device, such as tablet PCs, digital art tools, smart phones, or other devices with an interactive surface, and can be used for navigating user interface elements. Stylus devices can be operated passively (e.g., capacitive stylus) and may be used for the detection of a contact on a touch-enabled surface. Stylus devices can be active and may include electronic components that can electronically communicate with a host device. Stylus devices can be manipulated similar to a writing utensil, such as a pen or pencil, which can afford the user with familiarity in use, excellent control characteristics, and due to the ergonomics of such devices, allow the user to perform movements and manipulations with a high degree of control. This can be particularly apparent with respect to movements that may need a high level of precision and control, including actions such as drawing, painting, and writing when compared to other types of interfaces devices, such as gaming pads, joysticks, computer mice, presenter devices, or the like.

Stylus devices, as described herein, can be used for providing user inputs on a two-dimensional (2D) physical surface, such as a touch-sensitive pad, tablet, or display. In some cases, the tablet itself utilizes sensing technology to track the stylus's inputs (e.g., writing) on its surface. In some cases, 6-DOF-tracked stylus devices can have myriad tracking problems typically associated with them, which are usually more apparent when performing movements requiring precision tracking, such as writing text, drawing, and the like. For instance, unwanted noise may be introduced by optically-based tracking systems as tracking beacons (e.g., outside-in type tracking) disconnect and reestablish communication with the stylus device, which can occur when a user or other object blocks the stylus device from a line-of-sight communication with one or more of the beacons. This can manifest as a discontinuous line or a "jump" from one location to the next as the system recalibrates the location of the stylus device (typically on the order of millimeters), which may not be noticeable with coarse movements (e.g., gaming controllers), but could make precise writing or drawing impracticable or onerous with an intermittent loss of precision. One example of a manifestation of this type of noise is shown in FIG. 4C and described below in further detail.

Unwanted noise may also be introduced in inertial-based tracking systems. For instance, when operating a stylus device on a textured or rough surface, the vibrations may be detected by inertial sensors (e.g., inertial measurement unit or "IMU"), which can manifest as jagged or "noisy" lines that can detrimentally affect precision. One example of a manifestation of this type is shown in FIG. 4B and further described below in further detail.

Figure 5A:
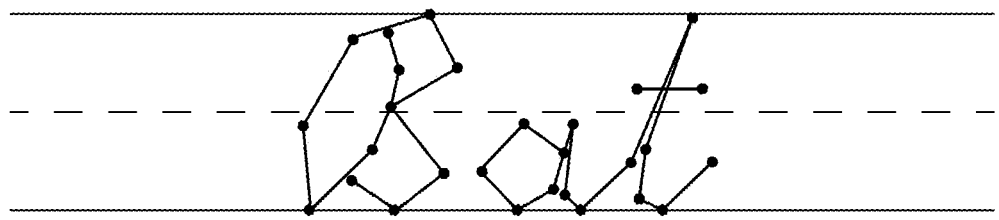
FIGS. 5A-5C show an application of a smoothing interpolation function in varying amounts on sample points that track a movement of a tip of a stylus device, according to certain embodiments.
Figure 5B:
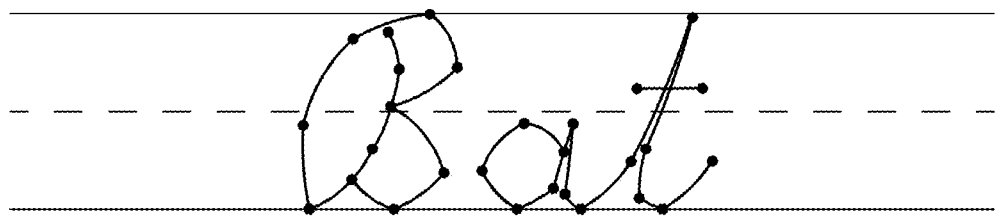
Figure 5C:
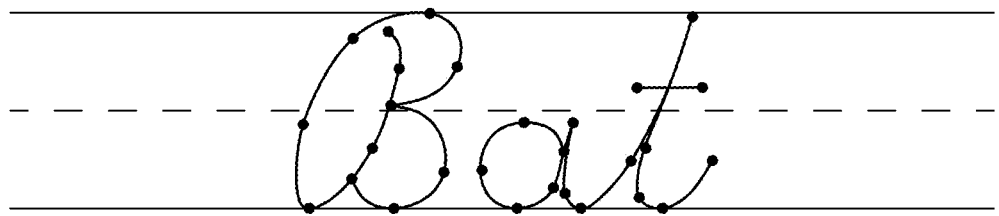

Embodiments of the present invention, as further described below, present an active stylus device that can be used to track movement in-air and on a physical surface with improved accuracy by mitigating the problems presented above. For instance, in some embodiments, a sliding window of a plurality of most recent samples (e.g., 2-10 most recent samples) are collected and a mean or median function is applied to the plurality of samples, with the resultant value being the newest tracked location of the stylus device (e.g., typically the tip of the stylus device in the applications presented herein). This "smoothing" algorithm can mitigate the discontinuity and vibration-induced noise inherent in certain tracking systems, as noted above. In some aspects, an interpolation algorithm (e.g., Catmull-Rom splines) can be applied to the series of newly tracked locations to estimate the segments connecting the newly tracked locations (e.g., calculated sample points) to better correspond to the actual movement of the stylus device between measured/determined locations. Examples of the application of interpolation algorithms are shown in FIGS. 5A-5C and further described below. In some embodiments, when operating on a surface, an accuracy of the stylus device may be improved by translating data corresponding to detected location of the tip of the stylus device from a 3D domain to a 2D domain that corresponds to the physical surface. In some cases, the determining and using of the newly tracked locations, though more accurate, may introduce a slight latency that could affect the user experience. To address this, some embodiments may add a final segment from the most recent newly tracked location (e.g., the median of the last n tracked locations) to the actual most recent tracked location. This can reduce or eliminate the perceived delay and improve the user experience.

Figure 8A:
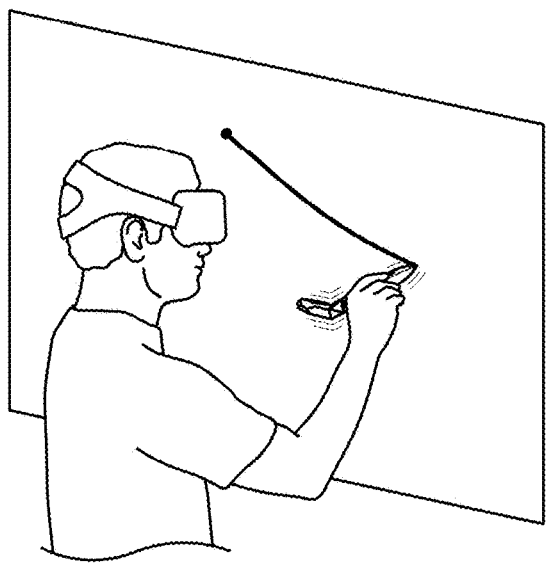
FIGS. 8A-8C show various output profiles for a stylus device based on detected surface characteristics of a physical surface, according to certain embodiments.
Figure 8B:
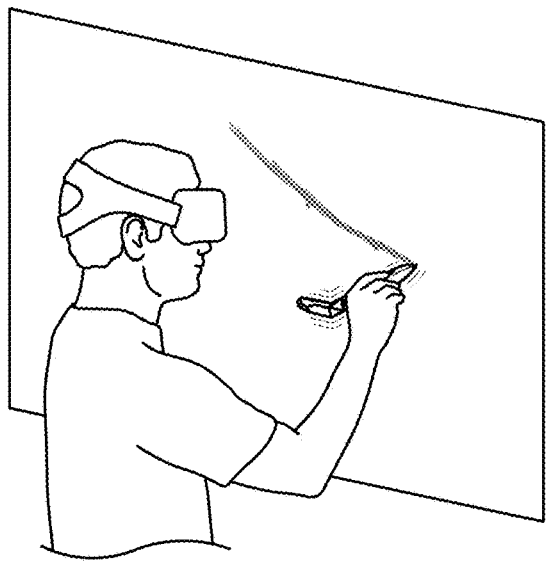
Figure 8C:
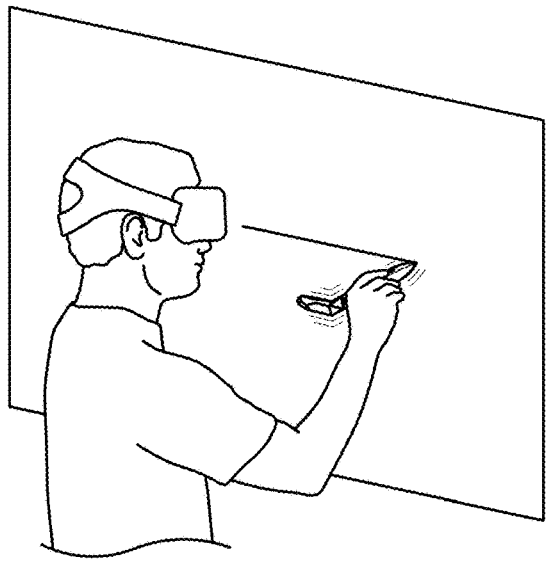

In some embodiments, the inputs on an input device can be synchronized to enhance the user experience. For instance, synchronizing inputs, such as stylus device's location (e.g., position and orientation) and detection of a contact of the tip of the stylus with a surface can be used to detect certain surface characteristics (e.g., via the IMU) and produce certain outputs that can take advantage of that synchronization. For example, when detecting particular characteristics, stylus control firmware/software may determine that the stylus device is operating on a certain surface type and can provide a selection of corresponding virtual output lines and haptic sensations. Furthermore, synchronization allows the tracking systems to know when the tip of the stylus device makes or breaks contact with a surface, which can be used to employ transitional effects (e.g., stop virtually inking when a tip is removed from a surface, taper virtual ink as the tip is slowly removed from the surface, add a wider virtual line upon surface impact to simulate a compression of a brush tip, etc.). Some examples of the benefits of synchronizing inputs are shown in FIGS. 8A-8C and further described below. Any of the embodiments expressly described, considered, and/or otherwise within the purview of the scope and spirit of the present application may be used in virtual reality (VR), augmented reality (AR), mixed reality (MR), or real environments, as further described below. Furthermore, although most embodiments expressly described herein include a stylus device, other input devices (e.g., computer mice, presenter devices, game controllers, remote controls, or any suitable user manipulated input device) can incorporate the novel concepts presented herein, as would be appreciated by one of ordinary skill in the art with the benefit of this disclosure.

It is to be understood that this high level summary is presented to provide the reader with a baseline, coarse understanding of some of the novel aspects of the present disclosure and a cursory roadmap to the details that follow. This high level summary in no way limits the scope of the various embodiments described throughout the detailed description and each of the figures referenced above are further described below in greater detail and in their proper scope.

Various Use Cases of Certain Embodiments

As described above, some basic elements of a typical AR/VR system include a device to immerse the user in an AR/VR environment (e.g., an HMD, holographic emitter, audio system, haptic feedback system, or the like), one or more input devices (e.g., a stylus, remote control, joystick, pistol grip controller, etc.) that allow the user to interface with the AR/VR environment, and a tracking system to track the location of the user, which may include tracking the location of the HMD, the input device, and/or other devices (e.g., wearables, etc.). One or more computing devices (e.g., desktop computer, laptop computers, gaming platforms, entertainment/media systems, cloud-based systems, combinations thereof, etc.) can be used to communicate with and control the various input and output elements.

There are a number of different types of tracking systems that can be used to track the location/orientation of an input device, according to certain embodiments. "Outside-in" systems typically use external devices to track the headset (e.g., HMD) and accessories (e.g., stylus device). The external tracking devices (e.g., cameras, IR sensors, etc.) may be placed around the room and can be directed generally toward the HMD and/or input device and can be configured to determine the position and orientation of the HMD and input device in relations to the AR/VR environment. Outside-in systems can have low latency and may be accurate, which can be further enhanced by incorporating additional tracking devices. Some downsides associated with outside-in systems include the need to remain in a set field of view, as well as the problem of occlusion, as outside-in tracking tends to rely on line-of-sight tracking. Thus, outside-in systems typically need a wide range of tracking capability (e.g., preferably 270 degrees or more) or risk losing a tracked location and orientation of the HMD and input device when the user turns or moves in certain positions or locations.

In "inside-out" systems, a camera or sensor array is placed on the device being tracked (e.g., HMD, stylus device) and determines how its position and/or orientation is changing in relation to the AR/VR environment. As the tracked device moves, the new tracked coordinates are updated in real-time. In some cases, inside-out tracking can be supplemented with fiducial markers to improve position/orientation tracking. One advantage is that a user can have greater freedom in movement within the virtual world without requiring sensors to be placed around the room. One disadvantage is that all computations occur within the tracked system itself, such as by the HMD, which can create performance limitations. One of ordinary skill in the art with the benefit of this disclosure would understand the many variations, modifications, and alternative embodiments of the various AR/VR systems that are available and how embodiments of the input devices (e.g., stylus devices) described herein may operate in these various systems.

FIG. 1A shows a user 105 operating a stylus device 150 in an "outside-in" AR/VR environment 100, according to certain embodiments. AR/VR environment 100 can include a computer 110 and any number of peripherals, which may include a display device 120, computer mouse 140, keyboard 130, a stylus 150, or other input/output device. User 105 is shown wearing a head-mounted display 190 and using stylus 150 to draft a letter on a virtual document 180 that is rendered to appear on a table top surface 170. Stylus 150 can be in wireless electronic communication with one or more external sensors 160 (1, 2, . . . n), HMD 190, computer 110, or any combination thereof. Similarly, HMD 190 can be in wireless electronic communication with one or more external sensors 160 (1, 2, . . . n), computer 110, stylus 150, or any combination thereof.

As shown in FIG. 1A, user 105 can manipulate stylus 150 with high degree of precision due to its exceptional pen or pencil-like ergonomic properties that allow for extended use and reduced fatigue. An outside-in system may include emitters (e.g., infra-red light emitting diodes (IR LEDs)) configured on stylus 150. Alternatively or additionally, stylus 150 may include a plurality of sensors for inside-out tracking, as shown, which may perform movement and orientation calculations locally (e.g., by processor(s) 210) or externally (e.g., by HMD 190, computer 140, etc.). One of ordinary skill in the art with the benefit of this disclosure would understand the many variations, modifications, and alternative embodiments thereof for tracking stylus 110 with the various types of AR/VR tracking systems in use.

Figure 1B:
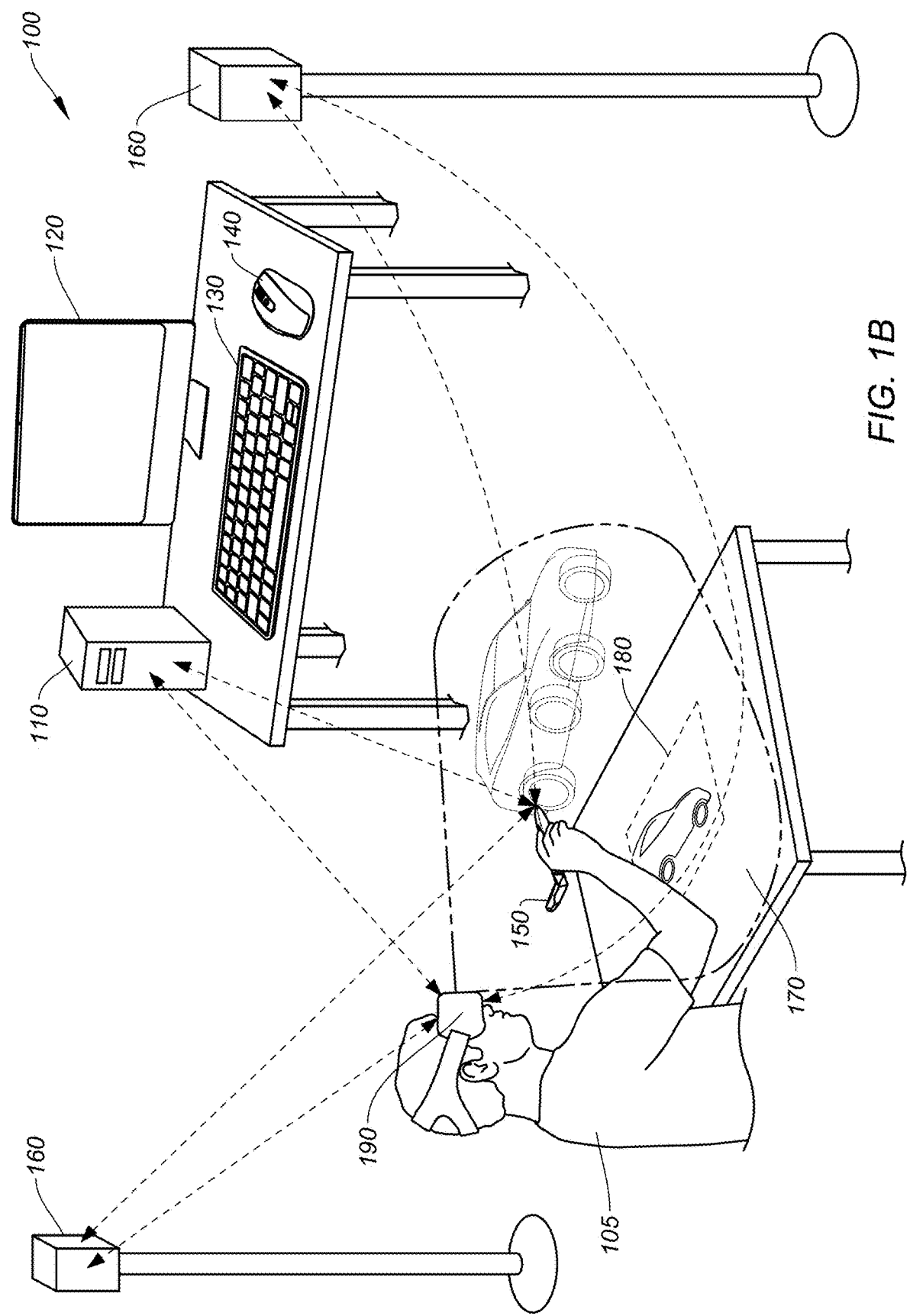
FIG. 1B shows a user operating a stylus device in-air in 3D space within an AR/VR environment, according to certain embodiments.

In certain embodiments, stylus device 150 can be configured to operate within and switch between 2D and 3D environments in an intuitive manner. HMD 190 can be configured to render document 180 (a 2D virtual object) substantially on a surface, as shown in FIG. 1A, or HMD 190 can display 2D or 3D objects in-air or in a volumetric space, as shown in FIG. 1B, where user 105 is editing a both a 2D rendering of a vehicle on surface 170 and a 3D representation of the vehicle in 3D space. Although embodiments of the various novel stylus devices described herein (see, e.g., FIGS. 4A-8C) can be used in any suitable application, a technical problem that the present invention is directed to solve is to reduce stylus tracking inaccuracies or tracking phenomenon that cause noise, discontinuous tracking, or other deleterious conditions, which can be consequential when the stylus device is being used to perform precise operations, such as writing or drawing, and may require a continuous and sustained accuracy within, e.g., 1-2 mm or less. In some cases, discontinuous tracking or tracking accuracy that is greater than 1-2 mm can make writing or drawing difficult or even impracticable in some cases, as the user experiencing these issues may try to compensate for the inconsistent inaccuracy and can result in a compromised and/or unacceptable result. Certain embodiments can be used to provide said continuous and sustained accuracy for high precision operations, as further described throughout this disclosure.

Simplified System Embodiment for a Stylus Device

Figure 2:
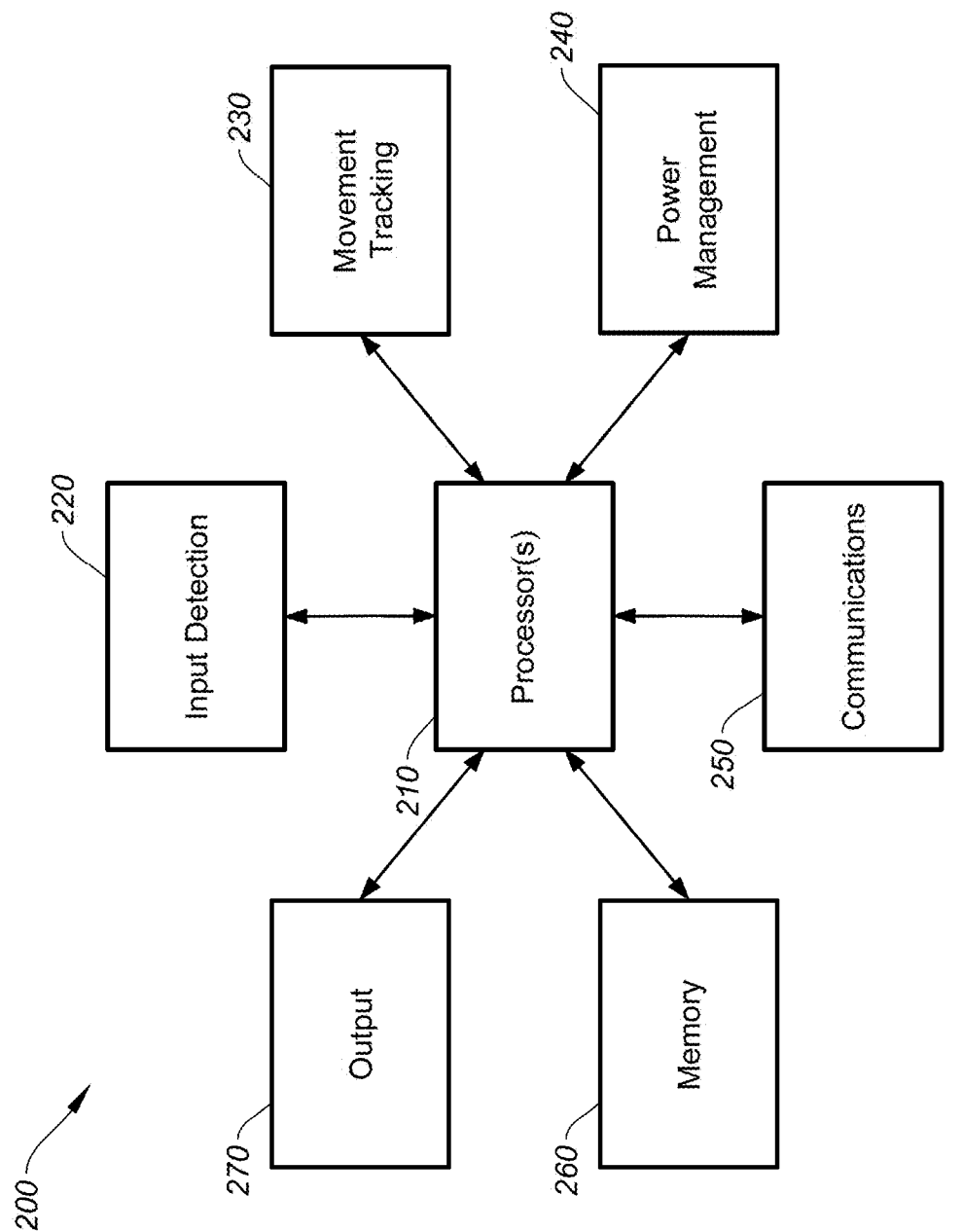
FIG. 2 shows a simplified block diagram of a system for operating a stylus device, according to certain embodiments.

FIG. 2 shows a simplified system block diagram ("system") 200 for operating a stylus device 150, according to certain embodiments. System 200 may include processor(s) 210, input detection block 220, movement tracking block 230, power management block 240, communication block 250, memory block 260, and output block 270. Each of the system blocks 220-270 can be in electrical communication with processor(s) 210. System 200 may further include additional systems that are not shown or described to prevent obfuscation of the novel features described herein, but would be expected by one of ordinary skill in the art with the benefit of this disclosure.

In certain embodiments, processor(s) 210 may include one or more microprocessors (µCs) and can be configured to control the operation of system 200. Alternatively or additionally, processor 210 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, µCs, DSPs, ASIC, programmable logic device, and the like, may be configured in other system blocks of system 200. For example, communications block 250 may include a local processor to control communication with computer 110 or HMD 190 (e.g., via Bluetooth, Bluetooth LE, RF, IR, hardwire, ZigBee, Z-Wave, Logitech Unifying, or other communication protocol). In some embodiments, multiple processors may enable increased performance characteristics in system 200 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Input detection block 220 can control the detection of button activation, scroll wheel, dial, trackball, roller manipulation (e.g., rotation detection), sliders, switches, touch sensors (e.g., one and/or two-dimensional touch pads), force sensors (e.g., nib and corresponding force sensor, button and corresponding force sensor), and the like. An activated input element (e.g., button press) may generate a corresponding control signal (e.g., human interface device (HID) signal) to control a computing device (e.g., a host computer) communicatively coupled to input device 150 (e.g., instantiating a "grab" function in the AR/VR environment). Alternatively, the functions of input detection block 220 can be subsumed by processor(s) 210, or in combination therewith. In some aspects, button press detection may be detected by a one or more sensors (also referred to as a sensor set), such as a load cell coupled to a button (or other surface feature). A load cell can be controlled by processor(s) 210 and configured to detect an amount of force applied to the button or other input element coupled to the load cell. One example of a load cell is a strain gauge load cell (e.g., a planar resistor) that can be deformed. Deformation of the strain gauge load cell can change its electrical resistance by an amount that can be proportional to the amount of strain, which can cause the load cell to generate an electrical value change that is proportional to the load placed on the load cell. Load cells may be coupled to any input elements on stylus device 150, as would be appreciated by one of ordinary skill in the art with the benefit of this disclosure.

In some embodiments, the load cell may be a piezo-type. Preferentially, the load cell should have a wide operating range to detect very light forces for high sensitivity detection (e.g., down to approximately 1 gram) to relatively heavy forces (e.g., up to 5+ Newtons). It is commonplace for a conventional tablet stylus to use up to 500 g on the tablet surface. However, in VR use (e.g., writing on a VR table or a physical whiteboard while wearing a VR HMD), typical forces may be much higher, thus 5+ Newton detection is preferable. In some embodiments, a load cell coupled to the nib (e.g., tip 310) may have an activation force that may range from 1 g to 10 g, which may be a default setting or set/tuned by a user via software/firmware settings. In some cases, a load cell coupled to the primary analog button may be configured with an activation force of 30 g (typically activated by the index finger). These examples are typical activation force settings, however any suitable activation force may be set as would be appreciated by one of ordinary skill in the art with the benefit of this disclosure. By comparison, 60-70 g are typically used for a mouse button click on a gaming mouse, and 120 g or more may be used to activate a button click function under a scroll wheel. A typical load cell size may be 4 mm×2.6 mm×2.06 mm, although other dimensions can be used.

In some embodiments, input detection block 220 can detect a touch or touch gesture on one or more touch sensitive surfaces (e.g., touch pad). Input detection block 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of stylus device 150 may or may not utilize touch detection or touch sensing elements.

Input detection block 220 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time-of-flight of the light path, etc.), acoustic sensors (e.g., piezo-buzzer coupled with microphones to detect the modification of a wave propagation pattern related to touch points, etc.), or the like. Stylus device 150 may incorporate some or all of the input elements or any aspect of the stylus devices described in U.S. patent application Ser. No. 16/370,648 and U.S. Pat. No. 10,719,143, which are herein incorporated by reference in their entirety for all purposes.

Movement tracking block 230 can be configured to track or enable tracking of a movement of stylus device 150 in three dimensions in an AR/VR environment. For outside-in tracking systems, movement tracking block 230 may include a plurality of emitters (e.g., IR LEDs) disposed on an input device, fiducial markings, or other tracking implements, to allow the outside-in system to track the input device's position, orientation, and movement within the AR/VR environment. For inside-out tracking systems, movement tracking block 230 can include a plurality of cameras, IR sensors, or other tracking implements to allow the inside-out system track the input device's position, orientation, and movement within the AR/VR environment. Preferably, the tracking implements (also referred to as "tracking elements") in either case are configured such that at least four reference points on the input device can be determined at any point in time to ensure accurate tracking. Some embodiments may include emitters and sensors, fiducial markings, or other combination of multiple tracking implements such that the input device may be used "out of the box" in an inside-out-type tracking system or an outside-in-type tracking system. Such embodiments can have a more universal, system-agnostic application across multiple system platforms.

In certain embodiments, movement detection block 230 can include an inertial measurement unit (IMU) for tracking movement, e.g., of stylus device 150. IMUS may be comprised of one or more accelerometers, gyroscopes, or the like. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. Accelerometers can further determine a velocity, physical orientation, and acceleration of stylus device 150 in 3D space. In some embodiments, gyroscope(s) can be used in lieu of or in conjunction with accelerometer(s) to determine movement or input device orientation in 3D space (e.g., as applied in an VR/AR environment). Any suitable type of IMU and any number of IMUS can be incorporated into stylus device 150, as would be understood by one of ordinary skill in the art. In some embodiments, the optical tracking of the stylus device may be operated by movement detection block 230. Movement tracking for a stylus device is described in further detail in U.S. Pat. No. 10,719,143, as noted above.

Power management block 240 can be configured to manage power distribution, recharging, power efficiency, and the like, for stylus device 150. In some embodiments, power management block 240 can include a battery (not shown), a USB-based recharging system for the battery (not shown), and a power grid within system 200 to provide power to each subsystem (e.g., communications block 250, etc.). In certain embodiments, the functions provided by power management block 240 may be incorporated into processor(s) 210. Alternatively, some embodiments may not include a dedicated power management block. For example, functional aspects of power management block 240 may be subsumed by another block (e.g., processor(s) 210) or in combination therewith.

Communications block 250 can be configured to enable communication between stylus device 150 and HMD 160, a host computer (not shown), or other devices and/or peripherals, according to certain embodiments. Communications block 250 can be configured to provide wireless connectivity in any suitable communication protocol (e.g., radio-frequency (RF), Bluetooth, BLE, infra-red (IR), ZigBee, Z-Wave, Logitech Unifying, or a combination thereof), or other communication resources, as described above.

Memory block 260 can include any suitable storage system (also referred to as a storage subsystem and computer readable medium/media). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. In some embodiments, memory block 260 may store stylus device tracking sample points, as further described below with respect to FIGS. 4A-8C. In some aspects, memory block 260 may store various smoothing algorithms (e.g., Catmull-Rom), as further described below.

Output block 270 may control various output systems for stylus device 150, according to certain embodiments. For instance, output control module 260 may control a number of visual output elements (e.g., mouse cursor, LEDs, LCDs), displays, audio outputs (e.g., speakers), haptic output systems, or the like. In some cases, input signals generated by haptic devices can be received and processed by input detection block 220, output block 270, another suitable block, or a combination thereof. For example, an input signal can be an input voltage, charge, or current generated by a load cell (e.g., piezoelectric device) in response to receiving a force (e.g., user touch) on its surface. In some embodiments, input detection block 220 may control an output of one or more haptic devices on stylus device 150. For example, certain parameters that define characteristics of the haptic feedback can be controlled by input detection block 220. Some input and output parameters can include a press threshold, release threshold, feedback sharpness, feedback force amplitude, feedback duration, feedback frequency, over voltage (e.g., using different voltage levels at different stages), and feedback modulation over time. Alternatively, haptic input/output control can be performed by processor 210 or in combination therewith.

Although certain systems may not expressly discussed, they should be considered as part of system 200, as would be understood by one of ordinary skill in the art. For example, system 200 may include a bus system to transfer power and/or data to and from the different systems therein. While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other subsystems as informed by design. For example, power management block 240 and/or movement tracking block 230 may be integrated with processor(s) 210 instead of functioning as a separate entity.

Simplified System Diagram for a Host Computing Device

Figure 3:
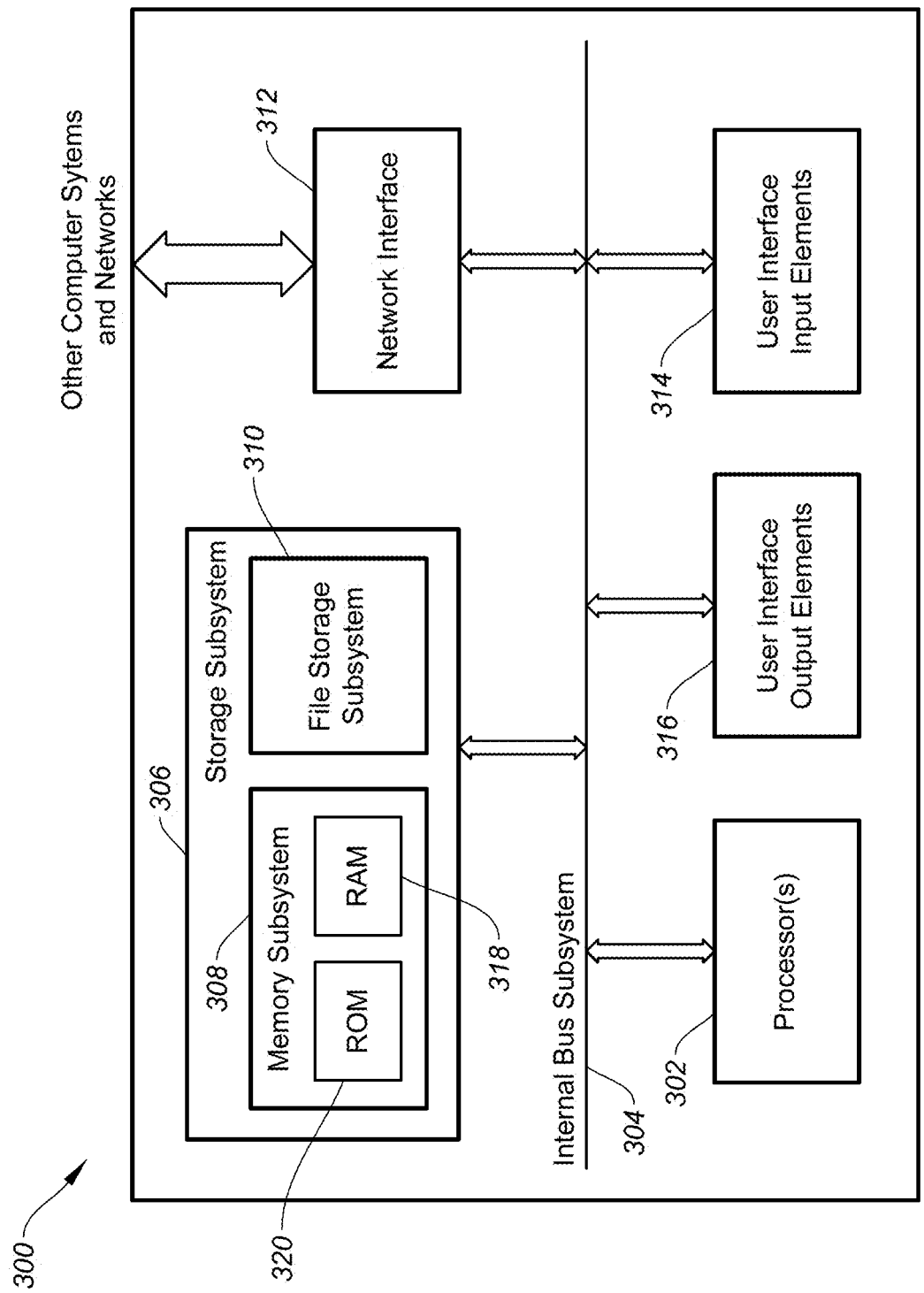
FIG. 3 shows a number of input elements on an input device, according to certain embodiments.

FIG. 3 is a simplified block diagram of a computing device 300, according to certain embodiments. Computing device 300 can implement some or all functions, behaviors, and/or capabilities described above that would use electronic storage or processing, as well as other functions, behaviors, or capabilities not expressly described. Computing device 300 includes a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, computing device 300 can be implemented in a host computing device, such as a desktop or laptop computer (e.g., computer 110), Head-mounted display (e.g., HMD 190), mobile device (e.g., tablet computer, smart phone, mobile phone), wearable device, media device, or the like, in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of stylus device 150, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a computing device 110 or HMD 190 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Embodiments to Mitigate Tracking Error in an Input Device

Embodiments of the present invention include a stylus device that can be tracked (e.g., in 6 DOF, 3 DOF, etc., in an AR/VR environment) with a reduced tracking error to facilitate the accurate location tracking of high precision movements like writing, drawing, or the like. Although many of the embodiments expressly described and depicted herein relate to a stylus device, aspects of the invention including the systems and methods configured to mitigate tracking error can be applied to any suitable input device (e.g., computer peripheral device, human interface device, etc.), as would be appreciated by one of ordinary skill in the art with the benefit of this disclosure.

Tracking error may manifest in several different ways in contemporary AR/VR tracking systems. For instance, in optical tracking systems, the AR/VR platform tends to re-align the virtual space with their tracking technology. For example, in some outside-in systems, realignment may occur as the result of a loss or addition of a tracking beacon signal, which can commonly occur when a user or object occludes the line-of-sight of the beacon with the tracked object (e.g., stylus device 150). The realignment may manifest as the virtual world shifting a few millimeters, which may go unnoticed in some applications (e.g., coarse gaming controls), but can be problematic when performing precision operations like writing, which could be rendered unrecognizable. Aspects of the invention are directed to reducing shift and other similar phenomena that reduce tracking accuracy introduced in optical-based tracking systems, as further described below.

Tracking error may be introduced by inertial-based tracking systems, particularly when tracking on surfaces. Typical surfaces are not perfectly smooth and often have non-uniform features including bumps, roughness, small debris (e.g., dirt, particles, etc.), imperfect planarity, or the like. Stylus device 150 can include an IMU configured to track acceleration and thereby help determine a location (e.g., position and orientation, or "pose") of the stylus device as it moves in-air or along a surface. In order to track stylus movement with high precision, IMUs can be highly sensitive and, in certain embodiments, can accurately track an acceleration of the stylus device in 6 DOF in the sub millimeter range. Consequently, vibrational noise may be introduced by the inertial tracking system as the input device moves along a surface (e.g., a nib of stylus device 150) due to surface features such as bumps, particles, or friction-induced vibration, which can be detected by the sensitive IMU and translated into tracked movement, thereby reducing the tracking accuracy of the system. Surface features aside, writing typically involves the lifting and replacing of a writing implement (e.g., stylus device 150) on a surface as a user moves between letters and words, or between objects, lines, etc., when drawing, for instance. This procession of lifting and impacting the surface can be detected by the IMU and translated into vibrational noise that can reduce tracking accuracy. Aspects of the invention are directed to reducing the effect of surface-induced noise and other similar phenomena that reduce tracking accuracy introduced in inertial-based tracking systems, as further described below.

Figure 4A:
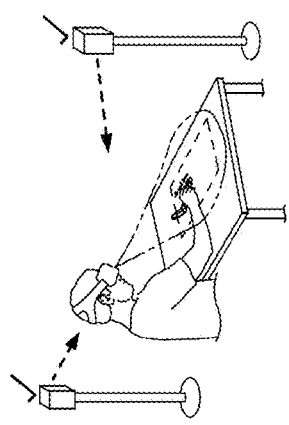
FIGS. 4A-4C show a user drafting a virtual document using a stylus device, according to certain embodiments.
Figure 4B:
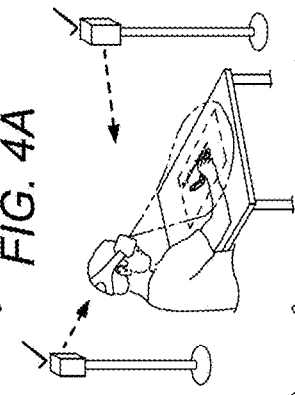
Figure 4C:
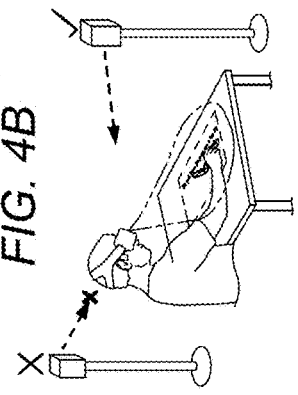

FIGS. 4A-4C show aspects of a user drafting a virtual document using a stylus device on a surface of a table under differing operating conditions, according to certain embodiments. In FIG. 4A, the stylus device has a clear line-of-site with the tracking beacons and optical tracking is operating satisfactorily. For the sake of simplicity, the surface of the table is smooth and free of debris. Thus, tracking noise introduced in the optical and inertial tracking systems are minimal and the corresponding text ("[t]he quick brown . . . ") being drafted by the user is shown to be sharp and easily legible. In FIG. 4B, the stylus device has a clear line-of-site with the tracking beacons and optical tracking is operating satisfactorily, however the surface of the table is rough resulting in noise-inducing vibrations on the stylus device that is tracked by the inertial tracking system. As described above, the vibrations can manifest in the written text as jagged lines that can vary from vaguely legible to unintelligible, depending on the extent of the vibration induced noise. Referring back to FIG. 4B, the text changes from substantially sharp and legible to coarse and barely legible (" . . . fox jumps") due to the vibration-induced noise detected by the inertial tracking system. In FIG. 4C, a line-of-sight tracking signal between the stylus device and one of the tracking beacons is occluded by the user, which can lead to a realignment when the line-of-sight is reestablished, as described above. The realignment can cause a shift in a detected location of the stylus device up to several millimeters or more and can manifest as a discontinuous line in the user's text and can markedly reduce its accuracy and intelligibility. Referring back to FIG. 4C, a shift occurs while the user is writing "over." In another example, if the user was drawing a straight line, a "stair step" may appear as a result of the realignment despite the user maintaining linear movement of the tip of the stylus device on the surface. The representations of FIGS. 4A-4C are simplified for the sake of explanation, but in actual use noise can be introduced simultaneously from multiple sources (e.g., optical tracking, inertial tracking, or other tracking systems, electrical noise, or other noise-inducing phenomena) and different intensities that can independently modulate in real-time, thus writing, drawing, or other activities that require highly accurate tracking can be challenging to maintain.

In some embodiments, systems can apply smoothing processing techniques (e.g., performed by system 200, system 300, or a combination thereof) on the sensor data to reduce location tracking error. For example, a sliding window comprised of n samples (e.g., typically 3-8 samples, or any suitable range) can be collected at every frame (e.g. typically Hz for conventional HMDs) and an average value and/or a median value can be computed and applied as a new tracked location with each newly received sample or a subset thereof. In other words, a tracked location (e.g., position, orientation, etc.) of an input device (e.g., stylus device 150 and/or tip thereof) can be tracked using some or all of the available location tracking systems (e.g., optical tracking, inertial tracking, etc.) and each new tracked location can be a product of an average or median of a newest sample point and a number of other most recent sample points. For instance, some embodiments may take an average of the most recent tracked sample point with the latest four samples to determine a new tracked location. In some embodiments, other numbers of samples and sequences of samples can be used (e.g., using non-consecutive samples). This smoothing technique can effectively operate to reduce or mute outlier readings that may be caused by noise or other deleterious, non-location-based inputs, and can yield a more accurate and uniform output that better tracks the movement of the input device for an improved user experience.

In certain embodiments, the smoothing processing techniques described above, though effective in mitigating tracking, can introduce some additional latency due as each newly calculated point is an average or median of a number of previous points. Though the latency can be small (e.g., 10-20 ms) it may be noticeable to the user and particularly when virtually writing or drawing. For instance, it can appear to the user that a line they are drawing is several millimeters behind the actual location of the physical tip of the stylus device. The user may try to adjust their usage to compensate for the gap between the tip and the last visible sample point while writing or drawing, which can negatively impact the user experience. To hide the latency and improve the user experience, some embodiments can add an additional segment that connects the last calculated location (e.g., the mean or median of the last n locations of the stylus tip) to the most recent actual tracked location of the stylus tip (e.g., raw data from the various location tracking systems corresponding the latest tracking sample(s)) to close the latency gap and give the appearance that the latest tracked location is at or very near the tip of the stylus device. The additional segment can be updated with every new sample point or any subset thereof. These processing techniques are further described below with respect to FIG. 6.

Interpolation

Once the median value is determined and new tracked locations are calculated via the software-based smoothing techniques described above, an interpolation algorithm can be applied to the series of newly tracked locations to estimate the segments connecting the newly tracked locations (e.g., calculated sample points) to better correspond to an actual movement of the stylus device between measured/determined locations of the stylus device. Any suitable interpolation algorithm can be applied, such as a Catmull-Rom splines interpolation consisting of piecewise-defined polynomial functions defining the segments connecting the newly tracked locations. In some aspects, all new location data or a subset thereof (e.g., ⅓ of newly determined sample point locations) can be used for interpolating the contours of the inter-sample segments. Some parameters that may be used to control properties of the segment contours include type (e.g., uniform, centripetal, and chordal) and tension to define how "tight" the splines appear to be. For example, when a Catmull-Rom splines interpolation is applied to the newly determined sample point locations of the stylus device 150, a tension of 1 may cause the segments to appear linear between points, which can look unnatural and likely does not match the actual trajectory of the tip of the stylus device on the surface, as shown in FIG. 5A. As the tension is reduced, as shown in FIG. 5B (e.g., tension=0.5) and FIG. 5C (e.g., tension=0), the contours of the segments appear to round out and track more realistic segment contours that likely track the actual physical movement of the stylus device between sampled/determined locations.

Synchronizing Inputs

In some embodiments, the various inputs and input elements on the input device (e.g. stylus device 150) can be synchronized to achieve improved functionality and a better user experience. The stylus device, for instance, can have multiple input sources including tracking systems (e.g., 6 DOF optical-based and inertial-based tracking), physical inputs including buttons on the stylus device, the tip (nib) and corresponding sensors (e.g., piezo-based sensor, strain gauge sensor, force sensor, etc.), etc., with each system having a certain latency that may differ between systems. Synchronizing these systems via a calibration process can be important for an improved user experience. In some embodiments, the visual model position within the AR/VR system can be adjusted (e.g., delayed) to compensate for transmission delay of the various inputs (e.g., from one or more sensors), which may be dependent upon intrinsic characteristics of the system. For example, transmission delay in various communication protocols such as Bluetooth® Low Energy (e.g., 7.5 ms), Logitech Unifying (e.g., 8 ms), various VR controllers (e.g., 2-3 ms), Logitech Lightspeed® (e.g., 1 ms or less), or the like, as would be appreciated by one of ordinary skill in the art with the benefit of this disclosure.

For example, a marker that corresponds with a usage of the stylus device can be used to synchronize a specific movement with a specific action on the inputs, such that the system could determine an amount of delay. Examples of markers can include detectable events such as: a determination that the stylus device tip contacted a physical surface, detection that a user pressed an input element, a surface edge detection event detected by both spatial displacement and a corresponding change of a nib input data profile, and the like. Embodiments may determine a surface edge detection event when, for instance, sensor data indicates that a stylus tip contacts an edge of a surface, e.g., the sensor data from the stylus tip may register zero force (e.g., the tip goes off the edge) and location tracking may indicate that the stylus tip moved in a direction orthogonal to the surface contour (e.g., the stylus tip drops off the edge of the surface). These different data sources can be used to synchronize and calibrate the various input systems described above.

In some embodiments, while operating a tip of the stylus device on a surface, location data that does not correspond to a known surface may be translated to the planar surface. In some cases, systems can run operations capable of detecting if some or all points drawn are co-planar enough to belong to a known surface. For instance, if the distance of each new point from the plane that is being evaluated from previous points is below a small threshold (e.g., 0.5-2 mm), then the system can determine that it belongs to the particular plane. In certain embodiments, when within a particular range of distance (e.g., 2-3 mm or less), the system may use ray casting. Given the position of the stylus device, a position to a known surface can be determined through a forward vector (e.g., a z-axis of a local coordinate) of the stylus device. The hit point (e.g., collision between the forward vector and the known surface) can be used as the 2D coordinate reference point that corresponds to the surface.

In some embodiments, contours of a surface may be defined using the tip of the stylus device in three or more locations to delimit a writing area for both physical and optical confirmation and synchronization (calibration) of the system. This can improve tracking on more complex contours with non-planar surfaces.

Figure 6:
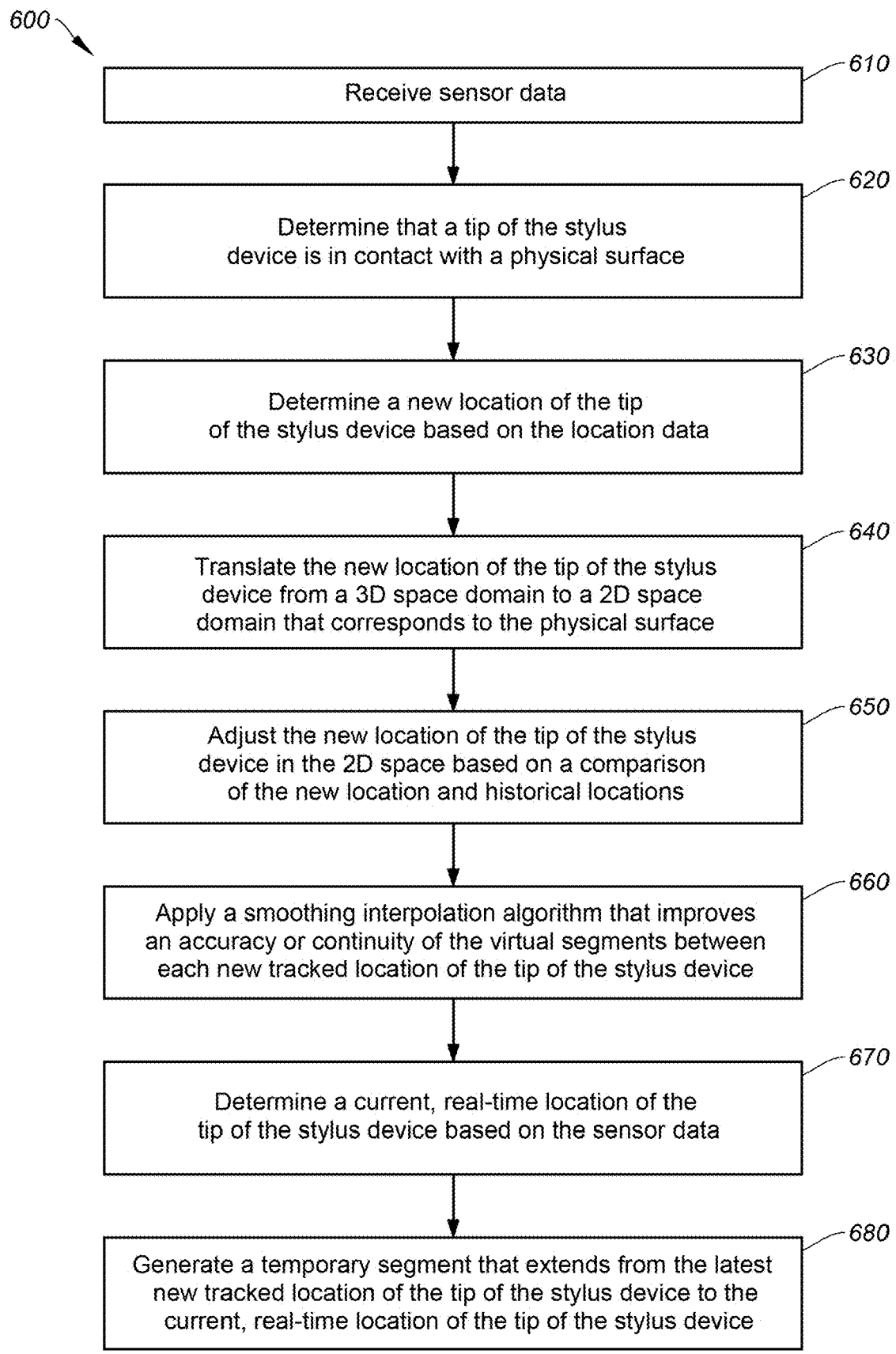
FIG. 6 is a simplified flow chart showing aspects of method of mitigating a tracking error of a location of a stylus device, according to certain embodiments.

FIG. 6 is a simplified flow chart showing aspects of a method 600 for mitigating a tracking error in of stylus device in an AR/VR environment, according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed by aspects of system 200 (processor(s) 210), system 300, or a combination thereof.

At operation 610, method 600 can include receiving sensor data from one or more sensors, according to certain embodiments. The sensors can include optical sensors (e.g., emitters or receivers), inertial sensors (e.g., IMU), touch/force sensitive sensors (e.g., capacitive sensors, piezo sensors, resistive sensors, etc.) or the like. The sensor data from the optical sensors and inertial sensors may correspond to a location (e.g., position and orientation ("pose")) of the stylus device. For instance, the sensor data can include 3-dimensional sample data corresponding to the location of the stylus device.

At operation 620, method 600 can include determining that a tip of the stylus device is in contact with a physical surface based on the sensor data, according to certain embodiments. For example, a touch sensitive or force sensitive sensor(s) configured on the tip (nib) of the stylus can generate sensor data indicative of when the tip comes into and out of contact with the physical surface. Such processing may involve comparing the sensor data from, e.g., the touch sensitive or force sensitive sensor(s) to determine if a reading from those sensors exceed a particular threshold. In some cases, operation 620 may further consider a time component (e.g., the sensor data exceeding a threshold for a given time period).

Alternatively or additionally, optical or inertial sensors can be used to derive a pose of the stylus device relative to the physical surface, which can also be used to determine when the tip of the stylus comes into contact with the physical surface. It is to be appreciated that as used herein, the term "pose" may refer to one or more components of the general understanding of pose, such a position of the stylus and/or the orientation of the stylus. The optical sensor data can be used, for example, can use image based analyses (e.g., via processor(s) 210 of system 200, processor(s) 302 of system 300 (e.g., computer 110, HMD 190, etc.)) to determine when the stylus comes into contact with the physical surface. As described above, the optical sensors can include a plurality of receivers or emitters controlled by one or more processors (e.g., of system 200, 300, or a combination thereof) and can be configured to facilitate the optical tracking of the location of the stylus device in 3D space. The inertial sensors may generate inertial data (e.g., acceleration data) that, in addition to being used to track a movement and pose of the stylus device, can be indicative of the tip of the stylus contacting the physical surface, such as an indication of an immediate stop when the tip contacts the surface, vibrations indicative of impact, or the like. As described above, the various sensor systems can be synchronized based on their separate and simultaneous indications of contact with a physical surface or other event that can be used to synchronize the sensor systems, as would be appreciated by one of ordinary skill in the art with the benefit of this disclosure.

At operation 630, while the tip is determined to be in contact with the physical surface, method 600 can include determining a new location of the tip of the stylus device based on the location data, according to certain embodiments. The location data can be comprised of the optical data, the inertial data, or other suitable data that can be used to derive the pose of the stylus device and the location of the tip. The location of the tip can be derived from the pose data of the stylus device itself. In some aspects, emitters and/or receivers may be configured on the tip of the stylus device for sensor data that directly corresponds to the location of the tip of the stylus device.

At operation 640, method 600 can include translating the new location of the tip of the stylus device from a three-dimensional (3D) space domain to a two-dimensional (2D) space domain that corresponds to the physical surface (writing surface), according to certain embodiments. In some aspects, the translating may include defining a threshold distance to the writing surface and projecting sample points of 3D data (e.g., point cloud) within the threshold on the physical surface. In some implementations, the 2D projection of the 3D data can correspond to the point over the plane that, together with the 3D point, form a vector perpendicular to the surface (normal vector). In some embodiments, the 3D to 2D translation consists of defining a threshold distance to the writing surface and projecting 3D points within such threshold on the writing surface. The 2D projection of the 3D point may correspond to the point over the plane that, together with the 3D point, is the local forward vector (local Z-axis) of the stylus device.

At operation 650, method 600 can include adjusting the new location of the tip of the stylus device in the 2D space based on a comparison of the new location and historical locations, according to certain embodiments. In some aspects, the new location and the historical locations are defined by sample points, and the adjusting of the new location of the tip of the stylus device in the 2D space may include a step of smoothing location data (e.g., calculating a mean or median of a latest n historical locations and, in some cases, the new location). Once the location data is smoothed, operation 650 may use the smoothed location data to determine the new tracked location of the tip of the stylus device. In some embodiments, the number of samples may correspond to an amount of noise present in the stylus device input signal (the sensor data), which may depend both on the sensor/device characteristics (e.g., location data, acceleration data, etc.) and on the type of surface (e.g., surface roughness, contour, etc.). In some cases, sample points can be modulated based on the input quality and expected output quality. In some embodiments, the n latest sample points is typically between 2-10 (e.g., latest 4 sample points), although any suitable range or value can be used including larger or smaller ranges and values. In some aspects, the n samples may change based on certain operational or detected environmental conditions. As described above, the stylus device is operable to facilitate the drawing of a virtual line that corresponds to the tracked location of a tip of the stylus device, the virtual line comprised of virtual segments formed between each new tracked location of the tip of the stylus device.

At operation 660, method 600 can include applying a smoothing interpolation algorithm that improves an accuracy or continuity of the virtual segments between each new tracked location of the tip of the stylus device, according to certain embodiments. The smoothing interpolation algorithm can be used to model the movement of the tip of the stylus device between sample points in a manner that can better track a user's movement of the tip of the stylus device, as described above with respect to FIGS. 5A-5C. In some aspects, the smoothing interpolation algorithm is a Catmull-Rom splines implementation. Any suitable piece-wise polynomial (spline) can be used as an interpolator, as would be appreciated by one of ordinary skill in the art with the benefit of this disclosure. Other suitable interpolation methods include Bezier splines and cubic splines. Such alternatives may utilize more than four reference (anchor) sample points that are calculated as a function of input data. Typically, four sample points with a Catmull-Rom splines interpolation can generate curved segments that satisfactorily track user movements, which can enable virtual inking functions to use filtered data directly and produce curves that are closer to the actual intention of the user (e.g., closer to captured data).

At operation 670, method 600 can include determining a current, real-time location of the tip of the stylus device based on the sensor data, according to certain embodiments. As described above, the determined new locations of the stylus device based on new and historical locations can be effective in reducing noise in corresponding tracking systems (e.g., optical and inertial tracking systems), however each resulting new tracked location may appear behind the actual location of the tip of the stylus device, particular if the user is moving the stylus device at a fast rate (e.g., the speed of the tip relative to a writing surface may be as high as 1-4 m/s, though slower and faster speeds are possible). The visual delay or gap could negatively impact the user experience. To accommodate this, at operation 680, method 600 can include generating a temporary segment that extends from the latest new tracked location of the tip of the stylus device to the current, real-time location of the tip of the stylus device. The temporary segment may be updated as new locations of the tip of the stylus device are received. This can visually close the gap and improve the user experience.

In some embodiments, while the tip is determined not to be in contact with the physical surface, the method does not translate the plurality of sample points from the 3D space domain to the 2D space domain that corresponds to the physical surface. In some embodiments, when the tip is determined not to be in contact with the physical surface, a different set of tracking conditions may be applied. For instance, while operating in-air, the stylus device may not track its location by comparing a most recent location with historical locations, or a smoothing interpolation algorithm may not be applied. By limiting method 600 to on-surface interactions (e.g., writing, drawing, etc.), computational expense and power consumption may be reduced. Furthermore, in-air use may not require the same precision that writing or drawing requires, so foregoing the mitigation of tracking error for in-air use may also reduce any latency between the actual location of the tip of the stylus and determined location, as would be appreciated by one of ordinary skill in the art with the benefit of this disclosure.

It should be appreciated that the specific steps illustrated in FIG. 6 provide a particular method 600 for mitigating a tracking error in of stylus device in an AR/VR environment, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Simulating Additional Surfaces and Functionality

In the embodiments described above, signal noise and tracking error can be filtered out to improve stylus device tracking on a surface. In some implementations, sensor data that is representative of scratches, bumps, and other surface features ("surface characteristics") that can be interpreted as "signal noise" or an contribute to tracking error can also be analyzed and utilized. For instance, surfaces like mirrors or glass have substantially different surface characteristics than foam, wood, fabric, canvas, a white board, or the like. The surface characteristics for one or more different types of surfaces can be determined in a variety of ways. For instance, the inertial tracking system may detect the various surface features described above, which may differ in size, in features per square cm, etc., based on vibrations caused by the corresponding surface features of the physical surface.

In some aspects, different surfaces may be simulated in an AR/VR environment by causing one or more haptic elements to generate vibrations that model how a particular type of surface would feel to a user when moving the tip of the stylus device along the surface. In some cases, a common surface can be used to simulate a number of different surface types based on the haptic output. If a user wishes to paint on a virtual canvas or draw on a piece of paper, the haptic output (e.g., originating at or around the stylus tip) can be modulated to simulate the frictional properties of a real-world canvas or piece of paper. Thus, some systems may filter out vibrational noise and some embodiments may additionally or alternatively add "noise" via the haptic elements to simulate the desired surface type.

In certain embodiments, a virtual output of the stylus device (e.g., virtual ink) may be selected based on the simulated surface type. For instance, when detecting that surface is canvas, or when generating haptic vibrations that simulate a virtual canvas, a stylus device may have a suite of outputs that resemble different sized brush strokes, spray paint patterns, or the like. In another example, when detecting that physical surface is a white board, or simulating a virtual whiteboard, the stylus output may resemble various marker types. In some implementations, certain outputs may be modulated based on the interaction of the stylus device with respect to the surface. For example, while operating on a virtual whiteboard, the stylus device may simulate a slightly thicker or thinner lines based on how hard the user is pressing the nib against the physical surface (e.g., detected by a load cell coupled to the nib), when the user lifts and replaces the stylus device relative to the physical surface, or the like. In another example, pressing the stylus device at a location where there is a virtual paint palette may cause more or less virtual ink to be capture by the virtual brush head on the tip of the stylus device. As a result, excess virtual paint may appear to drip or leave splash marks where the user impacts the physical surface with the stylus device at a threshold speed. In some embodiments, the system may simulate writing on a chalkboard or blackboard using haptic feedback and/or audio cues that sound and feel like the real experience, even though the user is actually writing on a different type of surface. This concept may be applied to any suitable surface type and corresponding haptic/audio characteristics. One of ordinary skill in the art with the benefit of this disclosure would appreciate the many modifications, variations, and alternative embodiments thereof.

In further embodiments, surface characteristics can be detected and analyzed to determine a surface type and once determined, the stylus device may modulate the method of mitigating a tracking error in of the stylus device in an AR/VR environment, as described above with respect to FIG. 6. For example, a different number of n samples or a different interpolation algorithm setting may be used based on the type of detected surface type. One of ordinary skill in the art with the benefit of this disclosure would appreciate the many modifications, variations, and alternative embodiments thereof.

Figure 7:
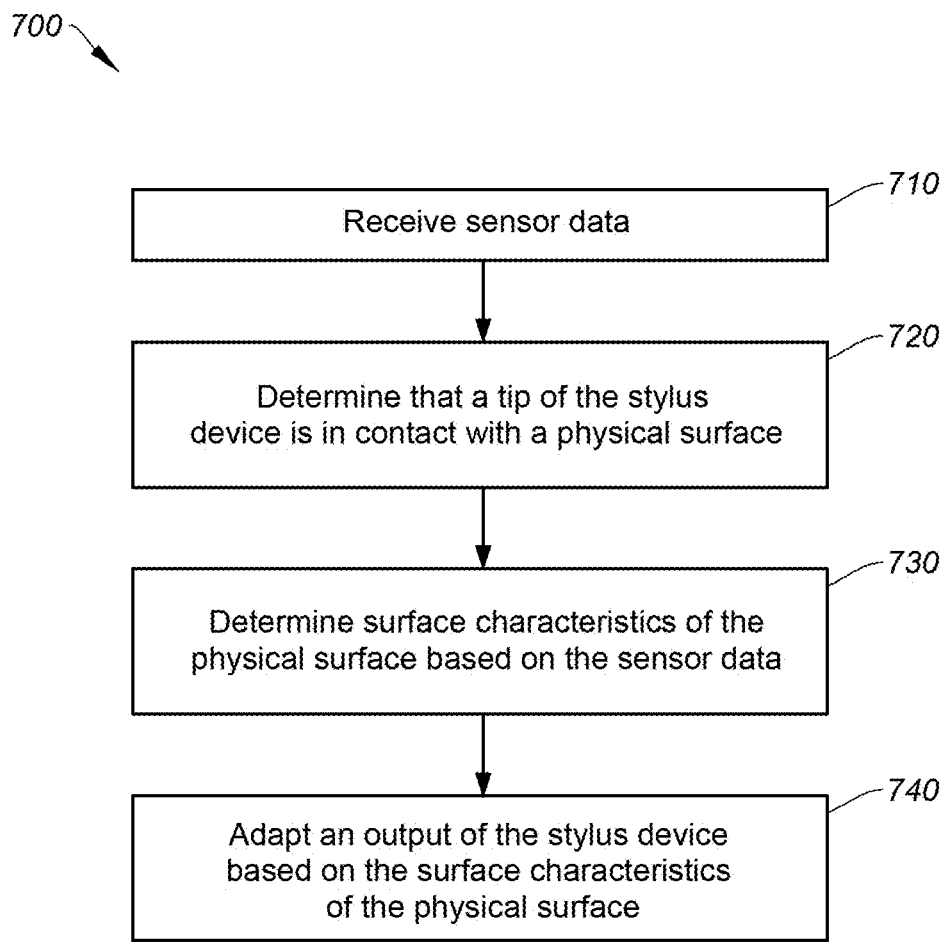
FIG. 7 is a simplified flow chart showing aspects of a method of modifying an output of a stylus device based on detected surface characteristics of a physical surface, according to certain embodiments.

FIG. 7 is a simplified flow chart showing aspects of a method 700 for adapting a virtual output of a stylus device based on surface characteristics of a physical surface, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by aspects of system 200, 300, or a combination thereof, as would be appreciated by one of ordinary skill in the art with the benefit of this disclosure.

At operation 710, method 700 can include receiving sensor data according to certain embodiments. The sensors can include optical sensors (e.g., emitters or receivers), inertial sensors (e.g., IMU), touch/force sensitive sensors (e.g., capacitive sensors, piezo sensors, resistive sensors, etc.) or the like. The sensor data from the optical sensors and inertial sensors may correspond to a location (e.g., position and orientation ("pose")) of the stylus device. For instance, the sensor data can include 3-dimensional sample data corresponding to the location of the stylus device.

At operation 720, method 700 can include determining that a tip of the stylus device is in contact with a physical surface based on the sensor data, according to certain embodiments. For example, a touch sensitive or force sensitive sensor(s) configured on the tip (nib) of the stylus can generate sensor data when the tip comes into contact with the physical surface.

At operation 730, method 700 can include determining surface characteristics of the physical surface based on the sensor data, according to certain embodiments. For example, surface characteristics may be determined based on vibrations detected by the inertial tracking system as the tip of the stylus device moves along the surface of the physical surface. In some embodiments, an optical sensor system can be used to identify surface characteristics of a surface based on visual properties of the physical surface (e.g., color, patterning, reflective properties, etc.). In some aspects, surface characteristics can be used to determine a surface type (e.g., wood, glass, plastic, rubber, fabric, etc.). Surface characteristics can be compared against known surface types (e.g., stored in memory 260, 306, etc.) to determine a suitable surface type for a given set of surface characteristics. In some aspects, the surface type may be provided by a user via a GUI on a host computing device (e.g., system 300) or via an interface on the stylus device. One of ordinary skill in the art with the benefit of this disclosure would appreciate the many modifications, variations, and alternative embodiments thereof.

At operation 740, method 700 can include adapting an output of the stylus device based on the determined surface characteristics and/or surface type of the physical surface, according to certain embodiments. In some aspects, different surfaces may be simulated in an AR/VR environment by causing one or more haptic elements to generate vibrations that model how a particular type of surface would feel to a user when moving the tip of the stylus device along the surface, as described above.

In certain embodiments, a virtual output of the stylus device (e.g., virtual ink) may be selected based on the simulated surface type. To illustrate, when detecting that the physical surface is a white board, or simulating a movement of the stylus device along virtual whiteboard via the haptic output on the stylus device, the stylus's virtual output may resemble various marker types. In some implementations, certain outputs may be modulated based on the interaction of the stylus device with respect to the surface. For example, while operating on a virtual whiteboard, the stylus device may simulate a slightly thicker or thinner lines based on how hard the user is pressing the nib against the physical surface (e.g., detected by a load cell coupled to the nib), when the user lifts and replaces the stylus device relative to the physical surface, or the like, as shown in FIG. 8A. In another example, when detecting that surface is canvas, or when generating haptic vibrations that simulate a virtual canvas, a stylus device may generate an output that causes an HMD to display a suite of virtual writing tools that resemble different sized brush strokes, spray paint patterns, or the like, as shown in FIG. 8B. In another example, pressing the stylus device at a location where there is a virtual paint palette may cause more or less virtual ink to be capture by the virtual brush head on the tip of the stylus device. As a result, excess virtual paint may appear to drip or leave splash marks where the user impacts the physical surface with the stylus device at a threshold speed. One of ordinary skill in the art with the benefit of this disclosure would appreciate the many modifications, variations, and alternative embodiments thereof.

In further embodiments, surface characteristics can be detected and analyzed to determine a surface type and once determined, embodiments may modulate the method of mitigating a tracking error in of the stylus device in an AR/VR/MR environment, as described above with respect to FIG. 7. For example, a different number of n samples or a different interpolation algorithm setting may be used based on the type of detected surface type. One of ordinary skill in the art with the benefit of this disclosure would appreciate the many modifications, variations, and alternative embodiments thereof.

In some embodiments, an audio output can be triggered (e.g., via HMD 190, stylus device 150, or other suitable peripheral device) to further enrich a surface type simulation. For example, when simulating a virtual white board, a squeaking type sound that sounds like a marker moving across a whiteboard may be triggered when the stylus device moves along the physical surface. In another example, a pencil or pen sound may be triggered when the system is simulating a pencil or pen on paper scenario, as shown in FIG. 8C. One of ordinary skill in the art with the benefit of this disclosure would appreciate the many modifications, variations, and alternative embodiments thereof.

It should be appreciated that the specific steps illustrated in FIG. 7 provide a particular method 700 for adapting a virtual output of a stylus device based on surface characteristics of a physical surface, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Virtual Output with a Virtual Mass

In some embodiments, surface types can be detected via audio cues (e.g., surface noise captured by a microphone integrated with the stylus device) as the stylus is moved along the corresponding surface. In some aspects, surface types can be simulated via haptics, or outputs may be generated based on a detected surface type, as described above.

In some implementations, a virtual output (e.g., virtual ink output) may have a virtual mass associated with it, such that a virtual output expelled from the tip of the stylus device may virtually accumulate on an underlying surface. For example, a stylus device may be configured to output a virtual oil-based or acrylic paint on an underlying canvas. The canvas may be a real canvas or a different surface type that may feel like a canvas due to a particular haptic output on the stylus device to simulate the textured surface of a canvas. The virtual paint may be spread relatively thin over areas of the canvas, or it can be accumulated in one or more locations such that the virtual paint builds up (amasses), which in turn can change the simulated surface type (e.g., via haptics) from a smooth canvas (e.g., a uniform, low-output haptic sensation) to a bumpy and rough texture (e.g., non-uniform, low-to-high output gradients) based on an amount of virtual paint that has amassed at the current location of the stylus device on the underlying canvas. Thus, the simulated surface may change dynamically in real-time as a virtual output (e.g., paint, water, materials like virtual sand, chalk, ash, graphite, etc., or the like) is expelled from the stylus device (e.g., a virtual brush) and deposited onto the underlying surface (e.g., virtual canvas) in contact with or in close proximity to the tip of the stylus device. The amount of dynamic change may depend on a current amount of virtual output in a current location, which may be based on an amount of corresponding virtual mass. In some embodiments, an increased virtual mass at a particular location on an underlying surface may cause the stylus device to simulate contours with peaks and valleys based on the distribution of the virtual mass. Alternatively or additionally, a virtual viscosity may be associated with a virtual mass. For instance, a haptic output of the stylus device may simulate a more viscous feel to the medium as the stylus is moved across the virtual canvas. In some aspects, a stylus device may cause a haptic effect to match a physical pattern on a surface. In some cases, the virtual model of the stylus in a virtual reality environment may be shifted such that a user feels and sees that the stylus device is not moving as expected. The delta in position may be perceived like a real physical impediment to the user.

Figure 9A:
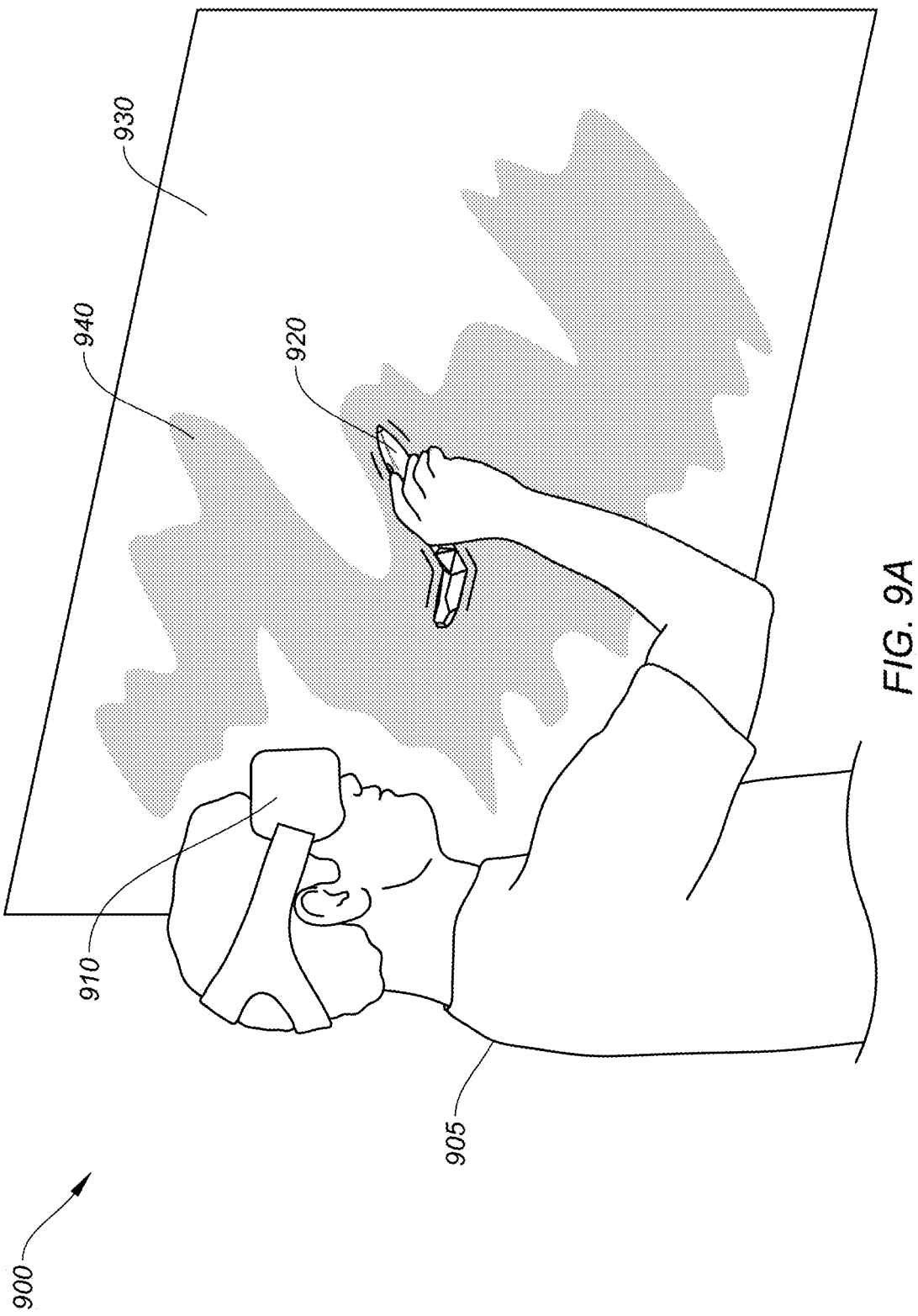
FIG. 9A shows an example of a virtual output from a stylus device deposited on a surface, according to certain embodiments.
Figure 9B:
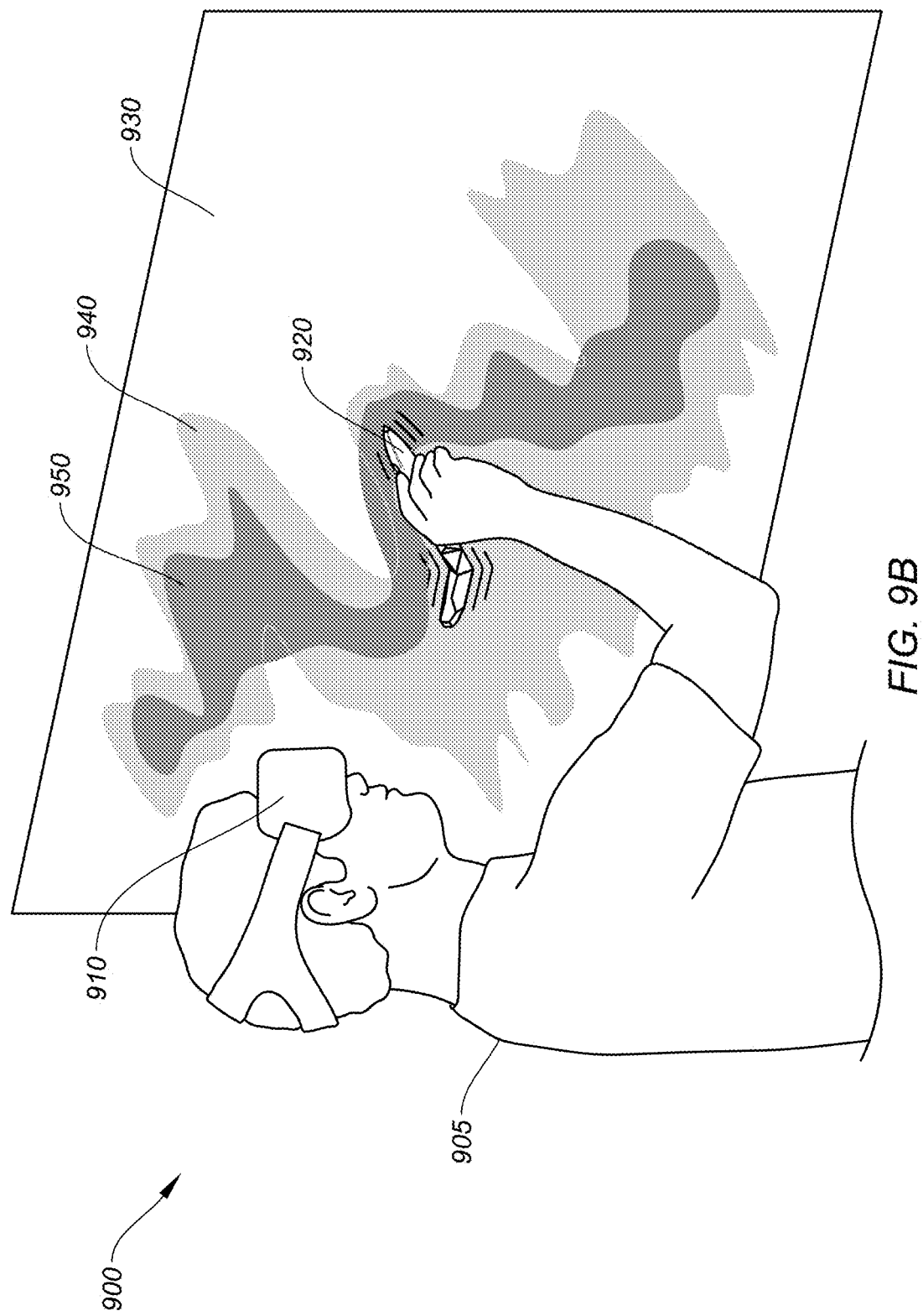
FIG. 9B shows an additional layer of a virtual output having a corresponding virtual mass, according to certain embodiments.
Figure 9C:
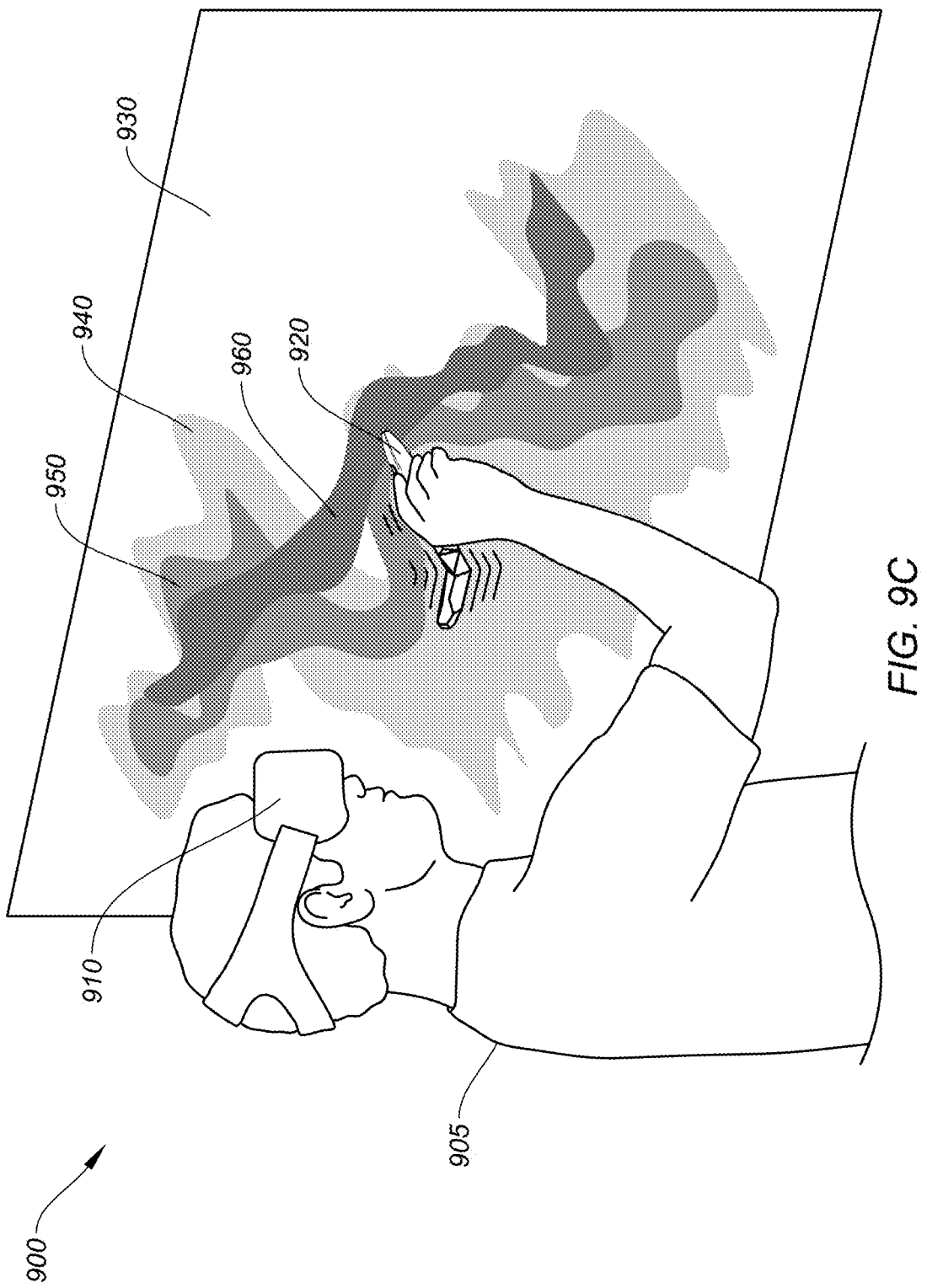
FIG. 9C shows another additional layer of a virtual output having a corresponding virtual mass, according to certain embodiments.

FIG. 9A shows an example of a virtual output from a stylus device deposited on a surface, according to certain embodiments. A user 905 is operating a stylus device 920 on a surface 930. A virtual output 940 is expelled from a tip of stylus device 920 and deposited on the surface 930. User 905 can view the virtual output 940 in an AR/VR environment via an HMD 910. HMD 910 and stylus device 920 may be similar to the HMDs and stylus devices described above, such as the description with respect to FIGS. 1-8C. Surface 930 may be detected through any suitable method described herein, including but not limited to, IMU-based detection, audio cues (e.g., a sound of the stylus device moving across the underlying surface), user defined input (e.g., a user indicates the surface), or the like, and a corresponding virtual surface type can be generated via haptic output system on stylus device 920, as described above. Virtual output 940 can be configured to simulate any suitable materials including fluids (e.g., paint, water), solids (e.g., chalk, charcoal, etc.), or non-conventional outputs for writing implements, such as flowers, insects, rocks, candy, or any other type of virtual output. Virtual output 940 is shown as a single virtual layer of paint having a mass. As user 905 transitions stylus device 920 from a blank canvas area to an area with virtual output 940 having a virtual mass, the stylus device may dynamically change a haptic output to simulate the sensation of moving from a smooth surface to a course and slightly bumpy or contoured surface, as may be expected when moving a real brush over an area with paint or other deposited material. Alternatively or additionally, the sensation may simulate a movement of the stylus device through a material having a viscosity based on an amount of mass of the virtual output 940 deposited at a current location. FIG. 9B shows an additional layer of a virtual output 950 having a corresponding virtual mass, according to certain embodiments. Stylus device 920 may have an increased haptic output based on the greater virtual mass at locations with additional virtual output 950. FIG. 9C shows another additional layer of a virtual output 960 having a corresponding virtual mass, according to certain embodiments. Stylus device 920 may have an increased haptic output based on the greater virtual mass at locations with additional virtual output 960.

Figure 10:
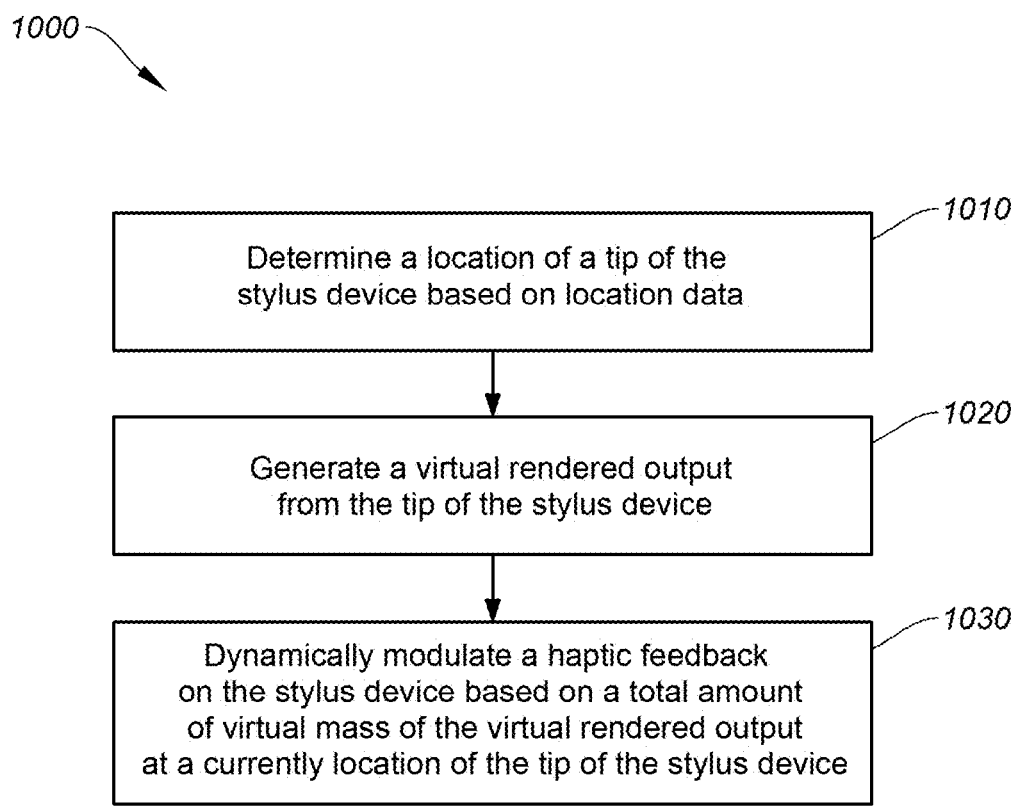
FIG. 10 is a simplified flow chart showing aspects of a method for generating a virtual output in an AR/VR environment with a stylus device, according to certain embodiments.

FIG. 10 is a simplified flow chart showing aspects of a method 1000 for generating a virtual output in an AR/VR environment with a stylus device, according to certain embodiments. Method 1000 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1000 can be performed by aspects of system 200, 300, or a combination thereof. For example, method 1000 may be performed by processor(s) 200 of system 200.

At operation 1010, method 1000 can include determining a location of the tip of the stylus device based on location data, according to certain embodiments. As noted in embodiments described above, a set of one or more sensors may be configured to generate sensor data that includes location data usable to derive a location of a stylus device. The set of one or more sensors can include optical sensors, inertial sensors (e.g., IMU), audio sensors (e.g., microphone(s)), or the like. In some embodiments, the one or more processors can be configured to determine that the tip of the stylus device is operating against a physical surface based on the sensor data, where the virtual rendered output is generated in response to determining that the tip of the stylus device is operating on or in a threshold proximity to (e.g., within 5 mm) the physical surface.

At operation 1020, method 1000 can include generating a virtual rendered output that is expelled from the tip of the stylus device, wherein the virtual rendered output includes a virtual mass, according to certain embodiments. The virtual rendered output can be a virtual ink, virtual paint, or other virtual liquid, solid, or particulate matter. In some aspects, the total amount of virtual mass of the virtual rendered output at the current location of the tip of the stylus device corresponds to an amount of virtual ink or paint that was expelled from the tip of the stylus device and deposited at the current location of the underlying surface. A shape of the virtual rendered output (e.g., a line type) may correspond to a selected virtual type of writing implement (e.g., virtual brush, virtual pen, virtual marker, etc.).

At operation 1030, method 1000 can include dynamically modulating a haptic feedback on the stylus device based on a total amount of virtual mass of the virtual rendered output that was expelled at a current location of the tip of the stylus device, according to certain embodiments. An intensity of the haptic feedback can be proportional to the total amount of virtual mass of the virtual rendered output deposited at the current location of the tip of the stylus device on the underlying surface.

It should be appreciated that the specific steps illustrated in FIG. 10 provide a particular method 1000 for generating a virtual output in an AR/VR environment with a stylus device, according to certain embodiments. Other sequences of steps may also be performed according to alternative embodiments. Furthermore, additional steps may be added or removed depending on the particular applications. For example, a subsequent operation (e.g., after operation 1030) may include shifting a position of the rendered model of the stylus device depending on the amount of virtual mass that needs to be rendered. Any combination of changes can be used and one of ordinary skill in the art with the benefit of this disclosure would understand the many variations, modifications, and alternative embodiments thereof.

Modifying Haptic Feedback Based on Scale

Figure 11A:
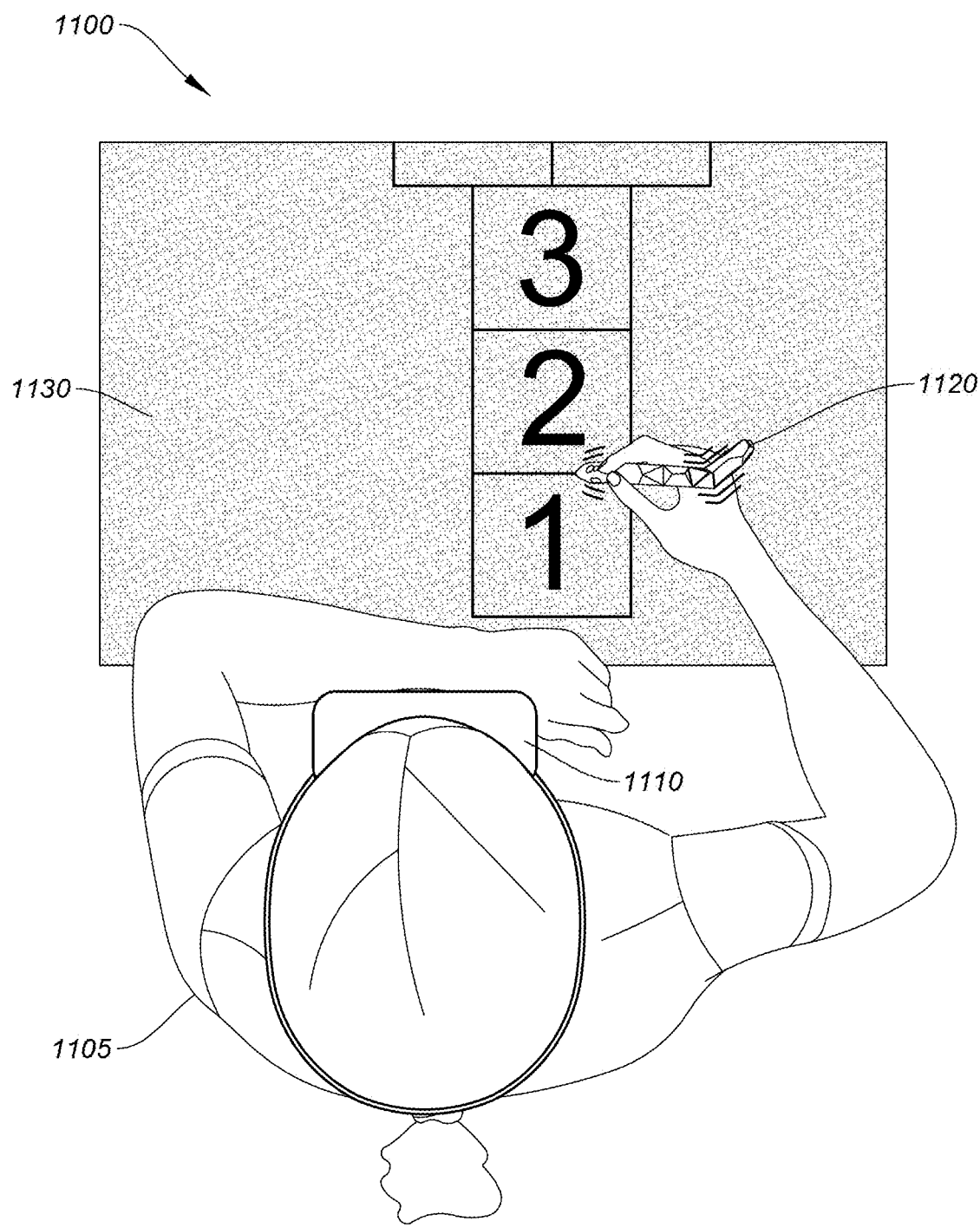
FIGS. 11A-11B show a user designing a section of a playground layout for a local school, as displayed via HMD using a stylus device, according to certain embodiments.
Figure 11B:
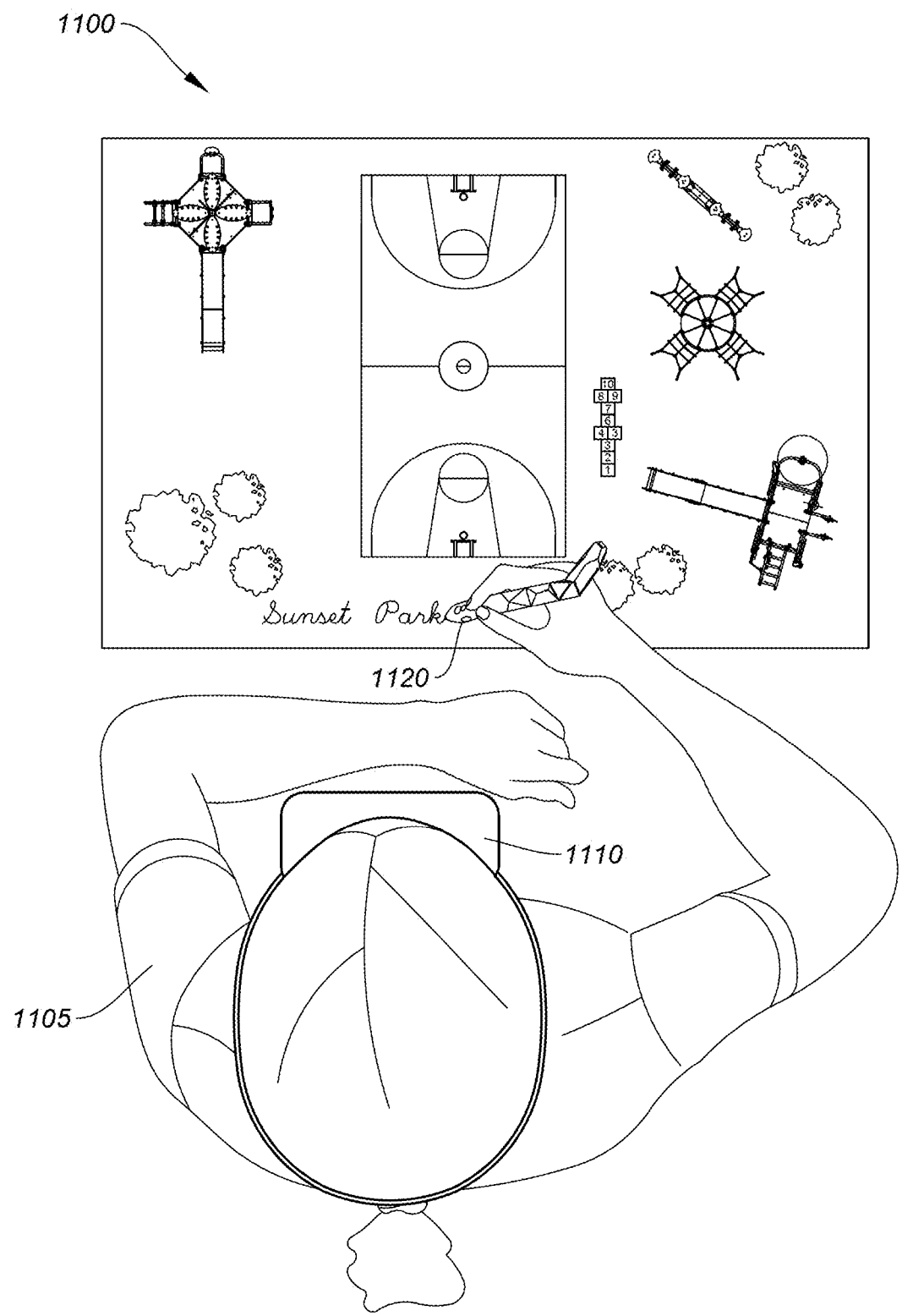

The presentation of scale in an AR/VR environment can be modified in ways that are typically not practicable in a real, physical environment. A scene can be presented to a user (e.g., via an HMD) as having a scale of 1:1, where objects in the AR/VR environment may appear to be accurately represented as they would in a corresponding real-world setting. However, scale can be manipulated in an AR/VR environment to larger (e.g., 10:1) or smaller (e.g., 0.1:1) ratios, which can present a user with more options for control and visual representation of scenes, objects, and the like. In some aspects, a haptic feedback on the stylus device may correspond to a surface type but may be modified based on the presented scale of the object or scene. For example, FIG. 11A shows a user 1105 designing a section of a playground layout 1100 for a local school, as displayed via HMD 1110, using a stylus device 1120, according to certain embodiments. The user is drawing a hop scotch board on a virtual tarmacadam surface 1130, which may cause the stylus device to generate a particular haptic feedback sensation that corresponds to vibrations that one may experience when moving chalk along a tarmacadam surface. As the scale changes, the intensity of the haptic feedback may change proportionally (e.g., linearly), non-linearly (e.g., according to a particular output function), or a combination thereof. For example, as the scale of surface 1130 increases, the haptic feedback may increase proportionally to simulate that the contours of the non-uniform, bumpy tarmacadam surface are more pronounced when seen from a closer perspective. In contrast, haptic feedback may decrease proportionally as the user zooms out from the surface in the AR/VR environment. For example, FIG. 11B shows user 1105 editing the playground layout 1100 from a zoomed out perspective (e.g., 20:1) that shows the entire scene. In this view, the haptic feedback may be reduced, removed, or changed to a different type of haptic feedback to better correspond to the current representation of the scene in the AR/VR environment. In some aspects, other types of haptic feedback may be introduced based on a particular scale of the scene. For example, "bumps" (e.g., short interval bursts of haptic feedback) or other types of haptic feedback may be used to indicate when user 1105 is moving stylus device 1120 across a boundary in the layout 1100 (e.g., over the rendering of the basketball court, trees, jungle gym, etc.).

Figure 12:
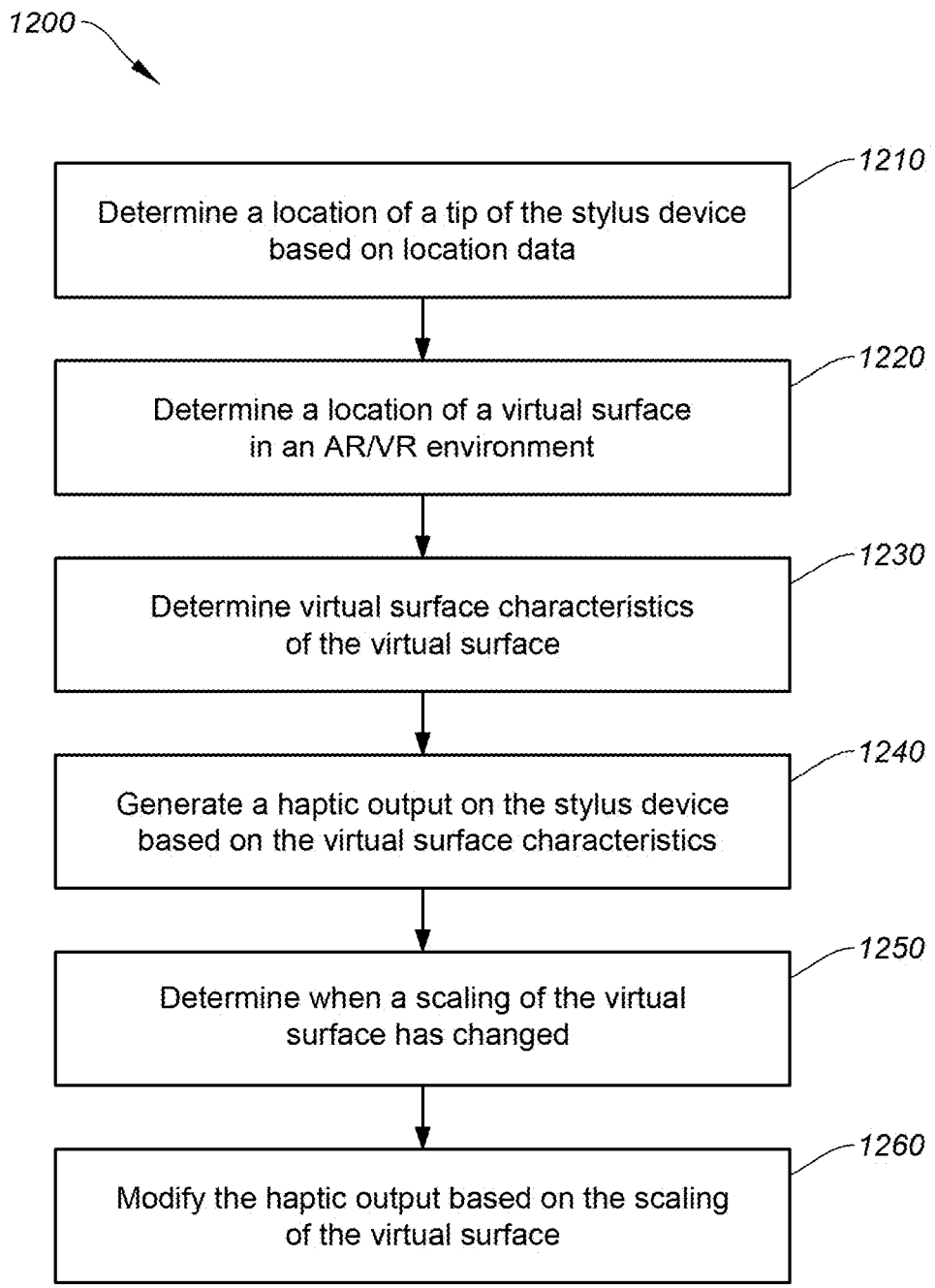
FIG. 12 is a simplified flow chart showing aspects of a method 1200 for modifying an intensity of a haptic feedback based on a scale of a virtual object or surface, according to certain embodiments.

FIG. 12 is a simplified flow chart showing aspects of a method 1200 for modifying an intensity of a haptic feedback based on a scale of a virtual object or surface, according to certain embodiments. Method 1200 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1000 can be performed by aspects of system 200, 300, or a combination thereof. For example, method 1000 may be performed by processor(s) 200 of system 200.

At operation 1210, method 1200 can include determining a location of the tip of the stylus device based on the location data, according to certain embodiments. The set of one or more sensors can include optical sensors, inertial sensors (e.g., IMU), audio sensors (e.g., microphone(s)), or the like. In some embodiments, the one or more processors can be configured to determine that the tip of the stylus device is operating against a physical surface based on the sensor data.

At operation 1220, method 1200 can include determining a location of a virtual surface in the AR/VR environment, according to certain embodiments.

At operation 1230, method 1200 can include determining virtual surface characteristics of the virtual surface, according to certain embodiments. The virtual surface characteristics of the virtual surface may be based on sensor data of the optical sensor or microphone. In some aspects, the virtual surface characteristics for the virtual surface are based on a selection of known surface types.

At operation 1240, method 1200 can include generating a haptic output on the stylus device when the tip of the stylus device makes contact with the virtual surface in the AR/VR environment, the haptic output based on the virtual surface characteristics of the virtual surface, according to certain embodiments.

At operation 1250, method 1200 can include determining when a scaling of the virtual surface has changed, according to certain embodiments. In some aspects, scaling can include increasing or decreasing a magnification of the virtual surface in the AR/VR environment.

At operation 1260, method 1200 can include modifying the haptic output on the stylus device based on the scaling of the virtual surface, according to certain embodiments.

It should be appreciated that the specific steps illustrated in FIG. 12 provide a particular method 1200 for modifying an intensity of a haptic feedback based on a scale of a virtual object or surface, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

In some embodiments, external sensors (e.g., external to the stylus device) can be used to provide data to the stylus device about an underlying surface. For instance, an HMD may utilize optical sensors to recognize that a surface is smooth and glossy (e.g., a whiteboard), which can be used to supplement the determination of the surface type. In some aspects, optical sensors can be used to recognize printed patterns that can be used to create a GUI virtual element attached to said patterns (e.g., AR markers). The printed patterns could be associated with surface types, and may be used to indicate to the stylus device what kind of haptic feedback or inking patterns should be produced.

In some embodiments, physical surfaces can be trained surfaces in the AR/VR environment. For example, in a setup or training procedure the system may request (e.g., via text or audio cue via HMD) that the user write on a surface within a current physical location and select the surface type from a drop down menu (e.g., mirror, white board, tabletop, etc.), allowing the system to train itself on the surface characteristics of the material within your physical space. Once trained, a simulated experience could be filtered to exaggerate or reduce the haptic experience (e.g., simulating a rougher/smoother timber desk).

In some embodiments, a known physical location can be set as a specific surface texture within the AR/VR environment. Within the AR/VR environment there may be a virtual whiteboard on a wall, but in the corresponding physical environment the actual wall may have a plaster surface. By mapping this location with the stylus device and training the system to simulate a whiteboard experience (e.g., via haptics and/or audio cues such as white board noises) within the mapped location or region.

In further embodiments, audio cues can be used to augment the AR/VR experience, as noted above. For instance, the sound of a marker on a whiteboard or chalk on a tarmacadam can be used to supplement haptic feedback corresponding to a virtual surface, as described above with respect to FIGS. 11A-12. In some aspects, an intensity of the audio cues and/or the haptic feedback may be further modified based on an amount of pressure applied with the stylus device on the underlying surface. In such cases, haptic and audio feedback may be synchronized to certain surfaces, AR markers, or the like.

In some embodiments, haptic feedback may introduce noise that can reduce sensor accuracy when measuring a location of a tip of the stylus device, as described above for instance with respect to FIGS. 1-6. In some aspects, information about the haptic feedback (e.g., frequency, amplitude, etc.) can be used to filter that noise from certain locations on the stylus device (e.g., the tip and corresponding sensors). In some implementations, haptic feedback may be provided at an upper portion of the stylus device (e.g., where a user holds the stylus device), and a lower portion of the stylus device (e.g., where the tip and corresponding sensors are located) may be separated from the upper portion by noise mitigating features, such as rubber grommets or other vibration absorbing materials to prevent or reduce vibrations from traveling from the upper portion to the lower portion of the stylus device.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word "comprising" does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

As used herein, the terms "computer simulation" and "virtual reality environment" may refer to a virtual reality, augmented reality, mixed reality, or other form of visual, immersive computer-simulated environment provided to a user. As used herein, the terms "virtual reality" or "VR" may include a computer-simulated environment that replicates an imaginary setting. A physical presence of a user in this environment may be simulated by enabling the user to interact with the setting and any objects depicted therein. Examples of VR environments may include: a video game; a medical procedure simulation program including a surgical or physiotherapy procedure; an interactive digital mock-up of a designed feature, including a computer aided design; an educational simulation program, including an E-learning simulation; or other like simulation. The simulated environment may be two or three-dimensional.

As used herein, the terms "augmented reality" or "AR" may include the use of rendered images presented in conjunction with a real-world view. Examples of AR environments may include: architectural applications for visualization of buildings in the real-world; medical applications for augmenting additional information to a user during surgery or therapy; gaming environments to provide a user with an augmented simulation of the real-world prior to entering a VR environment.

As used herein, the terms "mixed reality" or "MR" may include use of virtual objects that are rendered as images in conjunction with a real-world view of an environment wherein the virtual objects can interact with the real world environment and vice versa (e.g., the real world can interact with the virtual objects). Embodiments described below can be implemented in AR, VR, or MR environments.

As used herein, the term "real-world environment" or "real-world" may refer to the physical world (also referred to herein as "physical environment.") Hence, the term "real-world arrangement," with respect to an object (e.g., a body part or user interface device) may refer to an arrangement of the object in the real-world and may be relative to a reference point. The term "arrangement" with respect to an object may refer to a position (location and orientation). Position can be defined in terms of a global or local coordinate system. Similarly, the term "location" with respect to an object (e.g., the stylus device, the tip of the stylus device, another feature of the stylus device, another object, or the like) may refer to a position (e.g., location and orientation), which can also be referred to as an object's "pose."

As used herein, the term "rendered images" or "graphical images" may include images that may be generated by a computer and displayed to a user as part of a virtual reality environment. The images may be displayed in two or three dimensions. Displays disclosed herein can present images of a real-world environment by, for example, enabling the user to directly view the real-world environment and/or present one or more images of a real-world environment (that can be captured by a camera, for example).

As used herein, the term "head mounted display" or "HMD" may refer to a display to render images to a user. The HMD may include a graphical display that is supported in front of, around part of, or around all of a field of view of a user. The display can include transparent, semi-transparent or non-transparent displays. The HMD may be part of a headset. The graphical display of the HMD may be controlled by a display driver, which may include circuitry as defined herein.

As used herein, the term "electrical circuitry" or "circuitry" may refer to, be part of, or include one or more of the following or other suitable hardware or software components: a processor (shared, dedicated, or group); a memory (shared, dedicated, or group), a combinational logic circuit, a passive electrical component, or an interface. In certain embodiments, the circuitry may include one or more virtual machines that can provide the described functionality. In certain embodiments, the circuitry may include passive components, e.g., combinations of transistors, transformers, resistors, capacitors that may provide the described functionality. In certain embodiments, the circuitry may be implemented using, or functions associated with the circuitry may be implemented using, one or more software or firmware modules. In some embodiments, circuitry may include logic, at least partially operable in hardware. The electrical circuitry may be centralized or distributed, including being distributed on various devices that form part of or are in communication with the system and may include: a networked-based computer, including a remote server; a cloud-based computer, including a server system; or a peripheral device.

As used herein, the term "processor(s)" or "host/local processor(s)" or "processing resource(s)" may refer to one or more units for processing including an application specific integrated circuit (ASIC), central processing unit (CPU), graphics processing unit (GPU), programmable logic device (PLD), microcontroller, field programmable gate array (FPGA), microprocessor, digital signal processor (DSP), or other suitable component. A processor can be configured using machine readable instructions stored on a memory. The processor may be centralized or distributed, including distributed on various devices that form part of or are in communication with the system and may include: a networked-based computer, including a remote server; a cloud-based computer, including a server system; or a peripheral device. The processor may be arranged in one or more of: a peripheral device (e.g., a stylus device), which may include a user interface device and/or an HMD; a computer (e.g., a personal computer or like device); or other device in communication with a computer system.

As used herein, the term "computer readable medium/media" may include conventional non-transient memory, for example, random access memory (RAM), an optical media, a hard drive, a flash drive, a memory card, a floppy disk, an optical drive, and/or combinations thereof. It is to be understood that while one or more memories may be located in the same physical location as the system, the one or more memories may be located remotely from the host system, and may communicate with the one or more processor via a computer network. Additionally, when more than one memory is used, a first memory may be located in the same physical location as the host system and additional memories may be located in a remote physical location from the host system. The physical location(s) of the one or more memories may be varied. Additionally, one or more memories may be implemented as a "cloud memory" (i.e., one or more memory may be partially or completely based on or accessed using the network).

As used herein, the term "communication resources" may refer to hardware and/or firmware for electronic information transfer. Wireless communication resources may include hardware to transmit and receive signals by radio, and may include various protocol implementations, e.g., 802.11 standards described in the Institute of Electronics Engineers (IEEE), Bluetooth™, ZigBee, Z-Wave, Infra-Red (IR), RF, or the like. Wired communication resources may include: a modulated signal passed through a signal line, said modulation may accord to a serial protocol such as, for example, a Universal Serial Bus (USB) protocol, serial peripheral interface (SPI), inter-integrated circuit (I2C), RS-232, RS-485, or other protocol implementations.

As used herein, the term "network" or "computer network" may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network.

As used herein, the term "sensor system" may refer to a system operable to provide position information concerning input devices, peripherals, and other objects in a physical world that may include a body part or other object. The term "tracking system" may refer to detecting movement of such objects. The body part may include an arm, leg, torso, or subset thereof including a hand or digit (finger or thumb). The body part may include the head of a user. The sensor system may provide position information from which a direction of gaze and/or field of view of a user can be determined. The object may include a peripheral device interacting with the system. The sensor system may provide a real-time stream of position information. In an embodiment, an image stream can be provided, which may represent an avatar of a user. The sensor system and/or tracking system may include one or more of: an optical tracking system (e.g., camera system); an inertial-tracking system (e.g., IMU); a magnetic field based system; capacitive sensors; radar; acoustic; other suitable sensor configuration, optical, radio, magnetic, and inertial technologies, such as lighthouses, ultrasonic, IR/LEDs, simultaneous localization and mapping (SLAM) tracking, light detection and ranging (LIDAR) tracking, ultra-wideband tracking, and other suitable technologies as understood to one skilled in the art. The sensor system may be arranged on one or more of: a peripheral device, which may include a user interface device, the HMD; a computer (e.g., a P.C., system controller or like device); or other device in communication with the system.

As used herein, the term "optical system" or "camera system" may refer to a system comprising a single instance or a plurality of cameras or other light-sensitive sensor array(s). The optical system may comprise one or more of: a 2D camera; a 3D camera; an infrared (IR) camera; a time of flight (ToF) camera. The optical sensor(s) may include a complementary metal-oxide-semiconductor (CMOS), a charge-coupled device (CCD) image sensor, or any other form of optical sensor in use to form images. The optical sensor(s) may include an IR filter, which can be used for object tracking. The optical sensor(s) may include a red-green-blue (RGB) camera, which may be used for generation of real world images for augmented or mixed reality simulations. In an embodiment different frames of a single optical sensor system may be processed in an alternating manner, e.g., with an IR filter and for RGB, instead of separate cameras. Images of more than one camera may be stitched together to give a field of view equivalent to that of the user. An optical sensor system may be arranged on any component of the system. In an embodiment the optical sensor system is arranged on a headset or HMD, wherein a capture area of the optical sensor system may record a field of view of a user. Additional cameras may be arranged elsewhere to track other parts of a body of a user. Use of additional optical sensor (e.g., camera(s)) to cover areas outside the immediate field of view of the user may provide the benefit of allowing pre-rendering (or earlier initiation of other calculations) involved with the augmented or virtual reality rendition of those areas, or body parts contained therein, which may increase perceived performance (e.g., a more immediate response) to a user when in the virtual reality simulation. The optical sensor system may provide information, which may include an image stream, to an application program, which may derive the position and orientation therefrom. The application program may implement known techniques for object tracking, such as feature extraction and identification.

As used herein, the term "user interface device" may include various devices to interface a user with a computer, examples of which include: pointing devices including those based on motion of a physical device, such as a stylus device, mouse, trackball, joystick, keyboard, gamepad, steering wheel, paddle, yoke (control column for an aircraft) a directional pad, throttle quadrant, pedals, light gun, or button; pointing devices based on touching or being in proximity to a surface, such as a stylus, touchpad or touch screen; or a 3D motion controller. The user interface device may include one or more input elements. In certain embodiments, the user interface device may include devices intended to be worn by the user. Worn may refer to the user interface device supported by the user by means other than grasping of the hands. In many of the embodiments described herein, the user interface device is a stylus-type device for use in an AR/VR environment.

As used herein, the term "IMU" may refer to an Inertial Measurement Unit which may measure movement in six Degrees of Freedom (6 DOF), along x, y, z Cartesian coordinates and rotation along 3 axes—pitch, roll and yaw. In some cases, certain implementations may utilize an IMU with movements detected in fewer than 6 DOF (e.g., 3 DOF), and other coordinate systems (e.g., polar coordinate systems) may be used.

As used herein, the term "keyboard" may refer to an alphanumeric keyboard, emoji keyboard, graphics menu, or any other collection of characters, symbols or graphic elements. A keyboard can be a real world mechanical keyboard, or a touchpad keyboard such as a smartphone or tablet On Screen Keyboard (OSK). Alternatively, the keyboard can be a virtual keyboard displayed in an AR/MR/VR environment.

As used herein, the term "fusion" may refer to combining different position-determination techniques and/or position-determination techniques using different coordinate systems to, for example, provide a more accurate position determination of an object. For example, data from an IMU and a camera tracking system, both tracking movement of the same object, can be fused. A fusion module as described herein performs the fusion function using a fusion algorithm. The fusion module may also perform other functions, such as combining location or motion vectors from two different coordinate systems or measurement points to give an overall vector.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks. Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C#(CSharp), Perl, Ada, Python, Pascal, SmallTalk, FORTRAN, assembly language, and the like, may be used to implement machine instructions. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of function The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

What is claimed is:

1. A stylus tracking system for use in an AR/VR environment, the stylus tracking system comprising:
   one or more processors; and
   a set of one or more sensors controlled by the one or more processors and configured to generate sensor data, the sensor data including location data usable to derive a location of a stylus device;
   wherein the one or more processors are configured to:
   determine a location of a tip of the stylus device based on the location data;
   determine a location of a virtual surface in the AR/VR environment;
   determine virtual surface characteristics of the virtual surface;
   generate a haptic output on the stylus device when the tip of the stylus device makes contact with the virtual surface in the AR/VR environment, the haptic output based on the virtual surface characteristics of the virtual surface;
   determine when a scaling of the virtual surface has changed; and
   modify the haptic output on the stylus device based on the scaling of the virtual surface.

2. The stylus tracking system of claim 1 wherein the scaling includes increasing or decreasing a magnification of the virtual surface in the AR/VR environment.

3. The stylus tracking system of claim 1 wherein the set of one or more sensors includes at least one optical sensor or microphone, wherein the virtual surface characteristics of the virtual surface are based on sensor data of the optical sensor or microphone.

4. The stylus tracking system of claim 1 wherein the virtual surface characteristics for the virtual surface are based on a selection of known surface types.

5. A method of tracking a stylus device in an AR/VR environment, the method comprising:
   receiving, by one or more processors from a set of one or more sensors, sensor data that includes location data usable to derive a location of a stylus device;
   determining a location of a tip of the stylus device based on the location data;
   determining a location of a virtual surface in the AR/VR environment;
   determining virtual surface characteristics of the virtual surface;
   generating a haptic output on the stylus device when the tip of the stylus device makes contact with the virtual surface in the AR/VR environment, the haptic output based on the virtual surface characteristics of the virtual surface;
   determining when a scaling of the virtual surface has changed; and
   modifying the haptic output on the stylus device based on the scaling of the virtual surface.

6. The method of claim 5 wherein the scaling includes increasing or decreasing a magnification of the virtual surface in the AR/VR environment.

7. The method of claim 5 wherein the set of one or more sensors includes at least one optical sensor or microphone, wherein the virtual surface characteristics of the virtual surface are based on sensor data of the optical sensor or microphone.

* * * * *